United States Patent Office 3,031,450
Patented Apr. 24, 1962

3,031,450
SUBSTITUTED PYRIMIDO-[5,4-d]-PYRIMIDINES
Franz Gottwalt Fischer, Wurzburg, and Josef Roch and August Kottler, Biberach (Riss), Germany, assignors to Dr. Karl Thomae G.m.b.H., Biberach (Riss), Germany
No Drawing. Filed Apr. 12, 1960, Ser. No. 21,609
Claims priority, application Germany Apr. 30, 1959
10 Claims. (Cl. 260—247.5)

This is a continuation-in-part of copending application Serial No. 571,146, filed March 13, 1956, now abandoned.

This invention relates to substituted pyrimido-[5,4-d]-pyrimidines and a method of preparing them.

More specifically stated, the present invention broadly relates to substitution derivatives of pyrimido-[5,4-d]-pyrimidine (often also referred to as "homopurine") having the structural formula

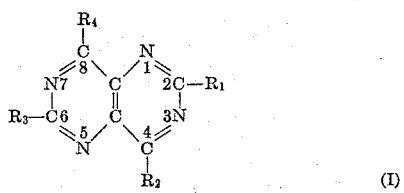

wherein two, three or all four of the substituents $R_1$ through $R_4$ are basic groups, that is, primary, secondary or tertiary amino groups; and, if only two or three of said substituents are basic groups, the remaining substituent or substituents are hydrogen, halogen, hydroxy, mercapto, lower alkyl, phenyl, phenoxy, lower alkoxy, lower alkoxy-lower alkoxy, (di-lower alkyl-amino)-lower alkoxy, lower alkyl-mercapto, phenyl-mercapto, benzyl-mercapto or carboxy-lower alkyl-mercapto.

The term "tertiary amino groups" as used herein is also understood to include substituents wherein the nitrogen is part of a heterocyclic ring, such as morpholyl, piperidyl, pyrrolidyl, piperazyl, tetrahydropyridyl and tetrahydroquinolyl, which in turn may carry substituents of its own, especially lower alkyl substituents.

The substituted homopurines according to the present invention may be prepared by the following methods:

Method A

By reacting substituted pyrimido-[5,4-d]-pyrimidines having the structural formula

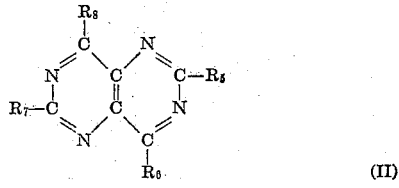

with a compound of the formula

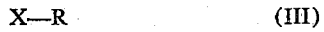

X—R (III)

In Formulas II and III, substituents $R_5$, $R_6$, $R_7$, and $R_8$, which may be alike or different from each other, represent the following: Hydrogen; hydrocarbon radicals with 1 to 12 carbon atoms, which may also be interrupted by hetero atoms, such as sulfur or oxygen; hydroxyl or substituted hydroxyl groups, such as alkoxy, aryloxy, or acyloxy groups; mercapto or substituted mercapto groups, such as alkyl mercapto, aralkylmercapto or aryl mercapto groups; amino or substituted amino groups such as mono- or di-alkylamino, -arylamino, -aralkylamino or -acylamino groups; guanidyl or substituted guanidyl groups; hydrazino or substituted hydrazino groups, such as alkyl-, aryl-, or acyl-hydrazino groups; or nitrogen containing heterocyclic radicals, such as morpholyl hexamethylenimino or piperidyl radicals; at least one of said substituents $R_5$, $R_6$, $R_7$ and $R_8$ being a halogen atom; substituent R represents the following: hydrogen; bromine; iodine; an hydroxyl or substituted hydroxyl group, such as an alkoxy, aryloxy, or acyloxy group; a mercapto or substituted mercapto group, such as an alkyl-mercapto or aryl-mercapto group; an amino or substituted amino group, such as a mono- or di-alkylamino, -arylamino, or -acylamino group; a guanidyl or substituted guanidyl group; a hydrazino or substituted hydrazino group, such as an alkyl-, aryl-, or acyl-hydrazino group; or a nitrogen containing heterocyclic radical, such as a morpholine or piperidine radical; and substituent X represents hydrogen or an alkali metal.

The pyrimido-pyrimidine compounds of Formula II used as starting materials for the preparation of the compounds of Formula I are produced according to methods known in the chemical arts; for instance, by halogenating the corresponding hydroxy pyrimido-pyrimidine compounds or by ring closure of suitable reaction components.

Hydroxy pyrimido-pyrimidine compounds are prepared, for instance, according to the method described in German Patent No. 845,940 and United States Patent 2,826,580.

Halogen is preferably introduced into such hydroxy pyrimido-pyrimidine compounds by heating them with inorganic acid halides, most advantageously by heating them with phosphorus halides, such as phosphorus oxychloride and phosphorus pentachloride. For instance, the following halogenated pyrimido-pyrimidines are obtained by such reactions:

2,4,6,8-tetrachloro-pyrimido-pyrimidine;
4,6,8-trichloro-pyrimido-pyrimidine;
4,6,8-trichloro-2-mercapto-pyrimido-pyrimidine;
4-methyl-mercapto-2,4-dichloro-pyrimido-pyrimidine; and others.

Halogenation of pyrimido-pyrimidine compounds containing exchangeable hydrogen atoms can be accomplished by the action of free halogen or of halogen-yielding compounds, such as N-halogenated succinimides and the like, in inert solvents. It is also possible to prepare halogen-substituted pyrimido-pyrimidine compounds which may be used as starting material for the process according to the present invention by suitable ring closure reactions, such as by a reaction of pyrimidine-4-carboxylic acids, which halogenated in the pyrimidine nucleus and substituted in the 5-position, with suitable reactants capable of forming the pyrimido-pyrimidine ring system. Such ring closure reactions are also disclosed in the above-identified United States patent.

The following starting materials having the general structural Formula II may be used in the reaction according to our invention without, however, limiting the invention thereto:

6-chloro-4,8-dihydroxy-pyrimido-pyrimidine;
2,6-dichloro-4,8-diamino-pyrimido-pyrimidine;
2,6-dichloro-4,8-dianilino-pyrimido-pyrimidine;
6-chloro-4,8-disemicarbazido-pyrimido-pyrimidine;
6-chloro-2-mercapto-4,8-dimorpholino-pyrimido-pyrimidine;
2,6-dichloro-4,8-di-phenyloxy-pyrimido-pyrimidine;
2,6-dichloro-4,8-di-phenyl-mercapto-pyrimido-pyrimidine;
6-methyl-mercapto-2,4-dichloro-pyrimido-pyrimidine;
4,6,8-trichloro-2-mercapto-pyrimido-pyrimidine;
6-chloro-4,8-diiodo-pyrimido-pyrimidine;
4,6,8-trichloro-pyrimido-pyrimidine;
2,4,6,8-tetrachloro-pyrimido-pyrimidine.

Compounds having the general structural Formula III which are suitable for reaction with the above-indicated and similar halogen derivatives of pyrimido-pyrimidine of the Formula II are, among others, the following:

Alkali metal hydroxides,
Alcohols,
Alkali metal alcoholates,
Phenols,
Alkali metal phenolates,
Ammonia
Primary or secondary amines,
Guanidines,
Hydrazines,
Amino alcohols,
Alkali metal hydrosulfides,
Mercaptans,
Thiophenols,
Alkali metal thiophenolates,
Morpholine,
Piperidine.

The exchange of halogen against hydrogen is effected by the action of reducing agents, for instance by the action of phosphorus diiodide ($P_2I_4$) and hydrogen iodide or of catalytically activated hydrogen. It is also possible to exchange a specific halogen atom in such compounds by a different halogen atom. Chloro-pyrimido-pyrimidine, for instance, can be readily converted into the corresponding iodo compound by reaction with sodium iodide in acetone as a solvent medium.

Reaction of compounds having the structural Formula II with compounds having the structural Formula III is carried out, in many instances, in the presence of an acid-neutralizing agent, such as an alkali metal hydroxide, an alkali metal carbonate, or a tertiary amine. If desired, an excess of the reaction component of Formula III may be employed for this purpose, provided such reaction component has acid-neutralizing properties.

The reaction according to the present invention can be carried out without or in the presence of solvents or diluents that are inert toward the reaction components. Suitable solvents or diluents are, for instance, acetone and other dialkyl ketones, dioxane, benzene, xylene, or dimethyl formamide. If required, the reaction may be facilitated by operating under pressure. Water and alcohols may also be used as solvents or diluents, especially in the absence of alkali metal hydroxides and at a low reaction temperature, since, under such conditions, no substantial reaction takes place between said solvents or diluents and the halogen-containing pyrimido-pyrimidine compounds. An excess of the reaction component of Formula III may also be employed as solvent or diluent, provided it is liquid under the reaction conditions.

The reaction temperature is between −20° C. and +250° C. If required, reaction accelerators, such as copper or copper salts, strong inorganic acids or catalysts of the Friedel-Crafts type, can be added during the reaction.

If at least two of the substituents $R_5$, $R_6$, $R_7$ and $R_8$ of the compounds of Formula II are halogen, the reaction according to the present invention may also be carried out stepwise. While, for instance, the halogen in 4- and 8-position is predominantly exchanged when working at a low temperature, such as room temperature or with cooling, it is possible to replace all halogen atoms which may be present, that is, also those in 2- and 6-position, by other groups when operating at a higher temperature, for instance at a temperature between 150° and 200° C. In this manner it is possible to produce pyrimido-[5,4-d]-pyrimidine compounds which contain different substituents $R_1$, $R_2$, $R_3$ and $R_4$.

When using certain halogen-containing starting materials which, in addition, contain other substituents such as hydroxyl groups, substituted hydroxyl groups, amino groups, and/or substituted amino groups, it is possible to effect the reaction with compounds of Formula III in such a manner that not only the halogen but also the other substituents are exchanged by group R of the reaction component of Formula III. Thus, it is, for instance, possible to convert 2,6-dichloro-4,8-dihydroxy-pyrimido-pyrimidine, 2,6-dichloro-4,8-diamino-pyrimido-pyrimidine, and 2,6-dichloro-4,8-dipiperidino-pyrimido-pyrimidine into 2,4,6,8-tetra-anilino-pyrimido-pyrimidine by reaction with aniline.

Method B

Another method of preparing the substituted homo-purines according to the present invention comprises reacting substituted pyrimido-[5,4-d]-pyrimidines having the structural formula

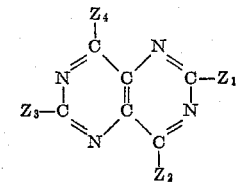

(IV)

with ammonia, a primary amine or secondary amine; the term "secondary amine" also includes heterocyclic compounds in which the nitrogen is a part of the heterocycle, such as piperidine, pyrrolidine, morpholine and the like. In Formula IV from one to all four of substituents $Z_1$ through $Z_4$, which may be identical or different from each other, are selected from the group consisting of hydroxyl, substituted hydroxyl, thiol, substituted thiol, amino, substituted amino, ring-nitrogen-containing heterocyclic radicals which are attached to the pyrimido-pyrimidine nucleus through the ring-nitrogen atom, or a quaternary ammonium group. If two or three of substituents $Z_1$, $Z_2$, $Z_3$ and $Z_4$ in Formula IV have the above-defined meanings, the remainder may also be selected from the group consisting of hydrogen and hydrocarbon radicals.

The reaction between compound IV and the ammonia, preliminary amine or secondary amine is preferably carried out at elevated temperatures and in the presence of an excess of the particular amine employed. If desired or necessary, it may also be performed in the presence of an inert solvent and/or a reaction accelerator and under superatmospheric pressure.

The substituted pyrimido-pyrimidine compounds of the Formula IV which are used as starting materials in this process may conveniently be prepared by the process described in German Patent 845,940 and U.S. Patent 2,826,580, but starting with the corresponding 5-amino-uracil-4-carboxylic acids wherein the pyrimidine ring carries substituents $Z_1$ to $Z_4$, as previously defined, instead of with the 5-amino-uracil-4-carboxylic acids disclosed in said patents.

The pyrimido-pyrimidine compounds IV used as starting materials in the present process may also be prepared by first preparing a trihydroxy-substituted or tetrahydroxy-substituted pyrimido-pyrimidine by the method described in said German and U.S. patents, then halogenating the tri- or tetrahydroxy compound to form the corresponding trihalo- or tetrahalo-substituted pyrimido-pyrimidine, and then exchanging the halogen for substituents $Z_1$ to $Z_4$, as previously defined, by Method A described herein. The exchange of all of the halogen for radicals $Z_1$ to $Z_4$ may be accomplished all at once or stepwise.

Primary and secondary amines which may be used as reactants in the reaction with compounds of the formula IV include the following: alkyl-amines, lower alkenyl amines, hydroxyalkyl-amines, alkoxyalkyl-amines, dialkylamino-alkyl-amines, aryloxy-alkyl-amines, aralkyl-amines, substituted aralkylamines whose substituent groups are inert under the reaction conditions, aromatic amines, substituted aromatic amines whose substituents are inert under the reaction conditions, polyhydroxyalkyl-amines, etherified polyhydroxyalkyl-amines, pyrrolidine, piperidine, morpholine, hexamethyleneimino, piperazine, substitution derivatives of these heterocyclic amines whose substituents include primarily halogen, alkyl, hydroxyl and alkoxy groups, hydrazine, alkyl-hydrazines and guanidines.

As indicated above, Method B may be carried out in the presence of a reaction accelerator. Examples of such reaction accelerators are acid addition salts of the amine reactant used, copper powder or copper salts.

It has also been stated above that the reaction may be carried out under superatmospheric pressures; this expedient is particularly advantageous when one or both of the reactants are relatively volatile substances.

Examples of suitable inert solvents for the present method are water, alcohol, acetone, dioxan, benzene and xylene. However, as previously indicated, a particularly preferable embodiment of this expedient is the use of an excess of the ammonia, primary amine or secondary amine reaction component as the solvent medium because under these circumstances the introduction of a foreign substance into the reaction mixture is not necessary.

The basic substituted pyrimido-pyrimidines of the Formula I obtained by Methods A and B above may be transformed into their water-soluble acid addition salts, and particularly into pharmacologically non-toxic acid addition salts, by customary methods, i.e. by reaction with the corresponding acid. Examples of pharmacologically non-toxic acid addition salts of the basic substituted homopurines according to the present invention are the acid addition salts formed with the following inorganic and organic acids: Hydrochloric acid, hydrobromic acid, sulfuric acid, phosphoric acid, acetic acid, tartaric acid, lactic acid, succinic acid, citric aid, nicotinic acid and camphor-sulfonic acid.

The following examples serve to illustrate the present invention without, however, limiting the same thereto.

EXAMPLE 1

4,8-Dianilino Pyrimido-Pyrimidine

This compound was prepared from 2,6-dichlor-4,8-dianilino pyrimido-pyrimidine by a reaction with hydrogen iodide and phosphorus diiodide.

12 gm. of phosphorus diiodide ($P_2I_4$) were added in small portions to a suspension, heated on a steam bath, of 3.8 gm. (0.01) 2,6-dichloro-4,8-dianilino pyrimido-pyrimidine in 40 cc. hydroge iodide ($d=1.7$) in the course of about half an hour. Heating was continued for one hour. The mixture was then cooled and the precipitated crystals were filtered off on a vacuum filter. The precipitate was extracted with 200 cc. of hot dioxane. 2.8 gm. of red, brilliant rhombic crystals remained after extraction. The yield was about 90% of the theoretical yield. The crystals were twice recrystallized from dimethyl formamide, whereby very slightly yellowish, small needles having a melting point of 255–256° C. were obtained which were analyzed as follows:

$C_{18}H_{14}N_6$; molecular weight: 314.3. Calculated: 68.77% C; 4.49% H; 26.74% N. Found: 68.61% C; 4.45% H; 27.04% N.

EXAMPLE 2

2,6-Dichloro-4,8-Diamino Pyrimido-Pyrimidine Compounds

Such compounds were obtained by reacting tetrachloro pyrimido-pyrimidine at room temperature with various amines.

(a) 2,6-dichloro-4,8-di-(N-hydroxy ethyl anilino) pyrimido-pyrimidine: 10.0 gm. (0.08 mol) N-hydroxy ethyl aniline, dissolved in 15 cc. dioxane, were poured into a solution of 5.4 gm. (0.02 mol) 2,4,6,8-tetrachloro pyrimido-pyrimidine in 50 cc. dry dioxane, while stirring. A yellowish crystalline precipitate rapidly separated out, accompanied by a slight generation of heat. The precipitate evidently consisted essentially of N-hydroxy-ethyl-aniline hydrochloride. 200 cc. water were added to the resulting suspension. The hydrochloride went into solution and, simultaneously, 2,6-dichloro-4,8-di-(N-hydroxy ethyl-anilino) pyrimido-pyrimidine was precipitated in the form of a yellow precipitate which was at first somewhat sticky but rapidly solidified. The yield amounted to 8.1 gm., corresponding to 86% of the theoretical yield. For analytical purposes the compound was repeatedly recrystallized from methanol, thereby yielding a bright yellow microcrystalline powder consisting of small prisms. Its melting point was 189–190° C.

Analysis—$C_{22}H_{20}O_2N_6Cl_2$; molecular weight: 471.3. Calculated: 56.05% C; 4.27% H; 17.83% N. Found: 56.12% C; 4.52% H; 17.61% N.

The following 2,6-dichloro-4,8-diamino pyrimido-pyrimidine compounds were prepared by proceeding in an analogous manner as described above under (a):

(b) With morpholine: 2,6-dichloro-4,8-dimorpholino pyrimido-pyrimidine, melting point: 276–277° C.

(c) With p-chloro-aniline: 2,6-dichloro-4,8-di-(p-chloro anilino) pyrimido-pyrimidine, melting point: 307–309° C.

(d) With β-hydroxy-ethylamine: 2,6-dichloro-4,8-di(β-hydroxy ethylamino) pyrimido-pyrimidine, melting point: 246–248° C.

(e) With β-diethylamino-ethylamine: 2,6-dichloro-4,8-bis(β-diethylamino ethylamino) pyrimido-pyrimidine, melting point: 128–130° C.

(f) With methyl - dodecyl - amine: 2,6 - dichloro - 4,8-bis - (methyl dodecylamino) pyrimido - pyrimidine, melting point: 76–77° C.

(g) With isoamyl - amine: 2,6 - dichloro - 4,8 - bis-(isoamylamino) pyrimido-pyrimidine, melting point: 94–95° C.

(h) With benzylamine: 2,6 - dichloro - 4,8 - bis - (benzylamino) pyrimido - pyrimidine, melting point: 229–230° C.

(i) With p-dimethylamino - aniline: 2,6 - dichloro-4,8 - bis - (p - dimethylamino aniline) pyrimido - pyrimidine, melting point: did not melt at or below 350° C.

(j) With diallylamine: 2,6 - dichloro - 4,8 - bis - (diallylamino) pyrimido - pyrimidine, melting point: 100–101° C.

(k) With methyl - cyclohexyl - amine: 2,6 - dichloro-4,8 - di - (methyl cyclohexyl amino) pyrimido - pyrimidine, melting point: 179–181° C.

(l) With β - chloro - ethylamine: 2,6 - dichloro - 4,8-di - (β - chloro ethylamino) pyrimido - pyrimidine: did not melt at temperatures up to 350° C.

(m) With butyl - ethanolamine: 2,6 - dichloro - 4,8-bis - (butylethanolamino) pyrimido - pyrimidine, melting point: 140–141° C.

(n) With benzyl - ethanolamine: 2,6 - dichloro - 4,8-bis - (benzyl-ethanolamino) pyrimido - pyrimidine, melting point: 173–175° C.

(o) With 2,3 - dihydroxy-propylamine: 2,6 - dichloro-4,8 - bis - (2,3 - dihydroxy-propylamino) pyrimido - pyrimidine, melting point: 208–210° C.

(p) With ammonia: 2,6 - dichloro - 4,8 - diamino pyrimido - pyrimidine: did not melt at 350° C. or below.

(q) With carbethoxy - methylamine: 2,6 - dichloro-4,8 - di - (carbethoxy - methylamino) pyrimido - pyrimidine, melting point: 207–209° C. with decomposition.

EXAMPLE 3

2,6-Dichloro-4,8-Dianilino Pyrimido-Pyrimidine

This compound was prepared from 2,6-dichloro-4,8-diiodo pyrimido-pyrimidine and aniline.

4.5 gm. (0.01 mol) 2,6-dichloro-4,8-diiodo pyrimido-pyrimidine were dissolved in 100 cc. dry dioxane. The solution was added dropwise, while stirring and cooling with ice, to a solution of 3.7 gm. (0.04 mol) aniline in anhydrous benzene in the course of half an hour. Yellow crystals started to precipitate out very rapidly. Stirring was continued for half an hour. The precipitated crude product was filtered off on a vacuum filter, triturated with slightly acid water (dilute hydrochloric acid), again filtered on a vacuum filter, washed and dried. 2.3 gm., corresponding to 61% of the theoretical yield, were obtained. For analytical purposes, the compound was recrystallized three times from dioxane, whereby very slightly yellowish, small needles having a melting point of 287–288° C. were obtained.

Analysis.—$C_{18}H_{12}N_6Cl_2$; molecular weight: 383.2. Calculated: 56.41% C; 3.16% H; 21.93% N; 18.50% Cl. Found: 56.61% C; 3.42% H; 21.79% N; 18.81% Cl.

EXAMPLE 4

2,4,6,8-Tetraanilino Pyrimido-Pyrimidine

This compound was prepared from 2,4,6,8-tetrachloro pyrimido-pyrimidine and aniline.

2.7 gm. (0.01 mol) tetrachloro pyrimido-pyrimidine, having a melting point of 255–258° C., were refluxed with 45 gm. aniline for 25 minutes. On pouring the resulting dark brown solution into 500 cc. of 1 N hydrochloric acid, crude tetraanilino pyrimido-pyrimidine precipitated out in the form of a brownish amorphous precipitate. Yield: 4.0 gm. corresponding to 80% of the theoretical yield. The compound was recrystallized three times from dioxane, whereby canary yellow, small needles having a melting point of 300–302° C. were obtained.

Analysis.—$C_{30}H_{24}N_8$; molecular weight: 496.6. Calculated: 72.56% C; 4.87% H; 22.57% N. Found: 71.70% C; 4.80% H; 23.27% N.

Said compound was also obtained by proceeding in the same manner but refluxing the following compounds with aniline:

2,6-dichloro-4,8-dianilino pyrimido-pyrimidine,
2,6-dichloro-4,8-diamino pyrimido-pyrimidine,
2,6-dichloro-4,8-dihydroxy pyrimido-pyrimidine, and
2,6-dichloro-4,8-dipiperidino pyrimido-pyrimidine.

The starting material, 2,4,6,8-tetrachloro pyrimido-pyrimidine, was obtained by refluxing 2,6-dichloro-4,8-dihydroxy pyrimido-pyrimidine with phosphorus oxychloride.

EXAMPLE 5

6-Chloro-4,8-Dimorpholino Pyrimido-Pyrimidine

This compound was obtained from 6-chloro-4,8-diiodo pyrimido-pyrimidine and morpholine.

A mixture of 2.0 gm. (0.023 mol) morpholine and 2.0 gm. (0.02 mol) triethylamine, dissolved in 20 cc. dioxane, was added to a solution of 4.2 gm. (0.01 mol) 6-chloro-4,8-diiodo pyrimido-pyrimidine in 50 cc. dioxane, while stirring and cooling. The mixture was allowed to stand for about half an hour. Subsequently, 400 cc. water were added thereto. The initially precipitated morpholine hydrochloride was again dissolved by addition of water, and crude 6-chloro-4,8-dimorpholino pyrimido-pyrimidine precipitated out. Yield: 2.7 gm. corresponding to 80% of the theoretical yield.

For analytical purposes, the compound was recrystallized three times from dioxane and yielded long colorless needles having a melting point of 199–200° C.

Analysis.—$C_{14}H_{17}O_2N_6Cl$; molecular weight: 336.8. Calculated: 49.93% C; 5.08% H; 24.96% N. Found: 49.41% C; 4.29% H; 24.81% N.

The starting material, 6-chloro-4,8-diiodo pyrimido-pyrimidine was prepared by reacting 4,6,8-trichloro pyrimido-pyrimidine with sodium iodide.

EXAMPLE 6

4,6,8-Triamino Pyrimido-Pyrimidine Compounds

These compounds were prepared by reacting 6-chloro-4,8-diamino pyrimido-pyrimidine compounds with various amines at elevated temperature and, if required, under pressure.

(a) 6 - morpholino - 4,8 - bis - (diethylamino) pyrimido - pyrimidine: 6 gm. (about 0.02 mol) 6-chloro-4,8-bis-(diethylamino) pyrimido-pyrimidine were heated in a sealed tube with 3.4 gm. (0.04 mol) morpholine to 180° C. for one and a half hours. The pasty reaction product was obtained in solid form only after reprecipitating it twice from very dilute hydrochloric acid and allowing it to stand for a prolonged period of time. 2.8 gm were obtained on drying in a vacuum at room temperature. For analytical purposes, the compound was recrystallized twice from a mixture of methanol and water (2:1) whereby ivory-colored, lustrous scales (small irregular leaflets) having a melting point of 73–75° C. were obtained.

Analysis.—$C_{18}H_{29}ON_7$; molecular weight: 359.5. Calculated: 60.14% C; 8.13% H; 27.27% N. Found: 59.89% C; 8.26% H; 27.28% N.

The following 4,6,8 - triamino - pyrimido-pyrimidine compounds were obtained by proceeding in a manner analogous to that described above under (a), but using different amines:

(b) 6 - methylamino - 4,8-bis-(ethylamino)-pyrimido-pyrimidine having a melting point of 94–96° C. from 6-chloro-4,8-bis - (ethylamino) - pyrimido - pyrimidine and methylamine.

(c) 6 - morpholino - 4,8 - di-(ethyl-ethanolamino)-pyrimido-pyrimidine having a melting point of 120–122° C. from 6-chloro-4,8-di-(ethyl-ethanolamino)-pyrimido-pyrimidine and morpholine.

(d) 6 - anilino - 4,8-diamino-pyrimido-pyrimidine having a melting point of 170–173° C. from 6-chloro-4,8-diamino-pyrimido-pyrimidine and aniline.

(e) 6 - diethanolamino - 4,8 - bis - (allylamino) - pyrimido-pyrimidine having a melting point of 104–106° C. from 6 - chloro-4,8-bis-(allylamino)-pyrimido-pyrimidine and diethanolamine.

(f) 6 - dimethylamino - 4,8 - diamino - pyrimido - pyrimidine having a melting point of 292–294° C. from 6-chloro-4,8-diamino-pyrimido-pyrimidine and dimethylamine.

(g) 6 - diethanolamino - 4,8 - dipiperidyl - pyrimido-pyrimidine having a melting point of 100–105° C. (sintering started at 95° C.) from 6-chloro-4,8-dipiperidyl-pyrimido-pyrimidine and diethanolamine.

(h) 6 - (β - hydroxy - ethylamino) - 4,8-dimorpholyl-pyrimido-pyrimidine having a melting point of 106–108° C. from 6-chloro-4,8-dimorpholyl-pyrimido-pyrimidine and β-hydroxy-ethylamine.

(i) 6 - methyl - ethanolamino-4,8-bis-(methylamino)-pyrimido - pyrimidine having a melting point of 64–66° C. from 6-chloro-4,8-bis-(methylamino)-pyrimido-pyrimidine and methyl-ethanolamine.

(j) 6 - morpholyl - 4,8 - di-(3-methoxypropyl-amino)-pyrimido-pyrimidine having a melting point of 80–82° C. from 6 - chloro - 4,8 - di - (3 - methoxypropyl-amino)-pyrimido-pyrimidine and morpholine.

(k) 6 - diisopropanolamino-4,8-dimorpholyl-pyrimido-pyrimidine having a melting point of 106–108° C. from 6-chloro-4,8-dimorpholyl-pyrimido-pyrimidine and diisopropanolamine.

(l) 6 - diethanolamino - 4,8-di-(p-nitro-anilino)-pyrimido-pyrimidine having a melting point of 310–311° C. from 6-chloro - 4,8-di-(p-nitro-anilino)-pyrimido-pyrimidine and diethanolamine.

(m) 6 - piperidino - 4,8-di-(β-hydroxy-ethylamino-pyrimido-pyrimidine having a melting point of 178–179° C. from 6-chloro-4,8-di-(β-hydroxy-ethylamino)-pyrimido-pyrimidine and piperidine.

(n) 6 - diethanol amino-4,8-dimorpholyl-pyrimido-pyrimidine having a melting point of 150–152° C. from 6-chloro-4,8-dimorpholyl-pyrimido-pyrimidine and diethanolamine.

(o) 6 - morpholyl - 4,8-bis-(ethylamino)-pyrimido-pyrimidine having a melting point of 151–153° C. from 6-chloro - 4,8 - bis-(ethylamino)-pyrimido-pyrimidine and morpholine.

(p) 6 - morpholyl - 4,8 - diamino-pyrimido-pyrimidine having a melting point of 266–267° C. from 6-chloro-4,8-diamino-pyrimido-pyrimidine and morpholine.

EXAMPLE 7

*2,4,6,8-Tetraamino-Pyrimido-Pyrimidine Compounds*

These compounds were prepared by reacting 2,4,6,8-tetrachloro-pyrimido-pyrimidine with various amines at elevated temperature and, if required, under pressure and in the presence of copper powder or copper salts as reaction acceleration.

(a) 2,4,6,8 - tetra - (dimethylamino)-pyrimido-pyrimidine: 2.7 gm. (0.01 mol) tetrachloro-pyrimido-pyrimidine were added in small portions, while stirring, to 50 cc. of a dimethylamine solution in absolute ethanol (containing 0.14 mol of dimethylamine), whereby the dichloro diamino compound precipitated out. 0.1 gm. copper sulfate was added to the resulting suspension and the mixture was heated in a sealed, thick-walled glass tube to 200° C. for one hour. The reaction solution was diluted with water and the crude reaction product was reprecipitated by dissolving it in 200 cc. 0.2 N hydrochloric acid, purifying the solution with animal charcoal, and precipitating the reaction product with concentrated ammonia. Yield: 1.7 gm. corresponding to 56% of the theoretical yield. For analytical purposes, the compound was recrystallized three times from absolute ethanol and dried at 130° C. in a vacuum of 0.1 mm. Bright yellow, irregular needles having a melting point of 164–165° C. were obtained.

*Analysis.*—$C_{14}H_{24}N_8$; molecular weight: 304.4. Calculated: 55.22% C; 7.95% H; 36.81% N. Found: 55.33% C; 7.86% H; 36.78% N.

The following 2,4,6,8-tetraamino-pyrimido-pyrimidine compounds were prepared by following the procedure described above under (a), but reacting tetrachloro-pyrimido-pyrimidine with various other amines, as indicated:

(b) With allylamine: 2,4,6,8-tetra-(allylamino)-pyrimido-pyrimidine having a melting point of 201–202° C.

(c) With methyl-ethanolamine: 2,4,6,8-tetra-(methyl ethanolamino)-pyrimido-pyrimidine having a melting point of 155–156° C.

(d) With β-hydroxy-ethyl amine: 2,4,6,8-tetra-(β-hydroxy ethylamino)-pyrimido-pyrimidine having a melting point of 180–182° C.

(e) With piperidine: 2,4,6,8-tetrapiperidyl-pyrimido-pyrimidine having a melting point of 163–165° C.

(f) With Morpholine: 2,4,6,8-tetramorpholyl-pyrimido-pyrimidine having a melting point of 266–268° C.

(g) With p-chloro-aniline: 2,4,6,8-tetra-(p-chloro-anilino)-pyrimido-pyrimidine having a melting point above 330° C.

(h) With ammonia: 2,4,6,8-tetraamino-pyrimido-pyrimido-pyrimidine; did not melt at a temperature up to 350° C.

(i) With methylamine: 2,4,6,8-tetra-methylamino-pyrimido-pyrimidine having a melting point of 202–204° C.

EXAMPLE 8

*2,6-Dimorpholyl-4,8-Dihydroxy-Pyrimido-Pyrimidine*

The compound was prepared by reacting 2,6-dichloro-4,8-dihydroxy-pyrimido-pyrimidine with morpholine in the presence of copper powder.

2.3 gm. (0.01 mol) 2,6-dichloro-4,8-dihydroxy pyrimido-pyrimidine were heated to about 200° C. with 17.4 gm. (0.2 mol) morpholine and a spatula-point-full of copper powder in a sealed heavy-walled glass tube for about 2 hours. The reaction mixture was dissolved in 200 cc. of water. The aqueous solution was filtered, and the pyrimido-pyrimidine compound was precipitated in the form of a yellow, amorphous precipitate by adding concentrated hydrochloric acid to the filtrate. Yield: 2.5 gm. corresponding to 75% of the theoretical yield. The compound was reprecipitated three times from hot dilute sodium hydroxide solution, whereby very fine, yellowish, small needles were obtained which did not melt, even at a temperature of 360° C.

*Analysis.*—$C_{14}H_{18}O_4N_6$; molecular weight 334.3. Calculated: 50.29% C; 5.43% H; 25.14% N. Found: 48.83% C; 5.57% H; 24.60% N.

EXAMPLE 9

*6-Chloro-4,8-Diamino-Pyrimido-Pyrimidine Compounds*

These compounds were obtained by reacting 4,6,8-trichloro-pyrimido-pyrimidine with various amines at room temperature and, if required, accompanied by cooling.

(a) 6 - chloro - 4,8 - di - allylamino pyrimido-pyrimidine: 4.6 gm. (0.08 mol) allylamine dissolved in 15 cc. dioxane were added, while stirring, to a solution of 4.8 gm. (about 0.02 mol) 4,6,8-trichloro-pyrimido-pyrimidine in 50 cc. dry dioxane. The temperature of the mixture increased slightly due to the exothermic reaction. After allowing the mixture to stand for a short period of time, water was added, whereby the crude reaction product precipitated as a yellowish amorphous precipitate which was filtered off on a vacuum filter and dried at room temperature in a vacuum. Yield: 4.8 gm., corresponding to 87% of the theoretical yield. The crude 6-chloro-4,8-di-allylamino-pyrimido-pyrimidine was purified by recrystallizing it twice from ethanol. The resulting fine, colorless needles melted at 114–116° C.

The following 6-chloro-4,8-diamino-pyrimido-pyrimidine compounds were prepared by proceeding in the same manner as described above under (a), but reacting 4,6,8-trichloro-pyrimido-pyrimidine with various other amines, as indicated:

(b) With methyl-ethanol-amine: 6-chloro-4,8-di-(methyl-ethanol-amino)-pyrimido-pyrimidine having a melting point of 90–92° C.

(c) With diisopropanol-amine: 6-chloro-4,8-bis-(diisopropanol-amino)-pyrimido-pyrimidine having a melting point of 177–179° C.

(d) With methylamine: 6-chloro-4,8-bis-(methylamino)-pyrimido-pyrimidine having a melting point of 227–229° C.

(e) With diethanol-amine: 6-chloro-4,8-bis-(diethanol-amino)-pyrimido-pyrimidine having a melting point of 135–136° C.

(f) With p-nitro-aniline: 6-chloro-4,8-bis-(p-nitro-anilino)-pyrimido-pyrimidine which did not melt on heating up to 350° C.

(g) With 3-methoxy-propyl-amine: 6-chloro-4,8-di-(3-methoxy - propylamino) - pyrimido - pyrimidine having a melting point of 98–100° C.

(h) With o-methoxy-aniline: 6-chloro-4,8-di-(o-methoxy-anilino)-pyrimido-pyrimidine having a melting point of 290–292° C.

(i) With dibenzyl-amine: 6-chloro-4,8-bis-(dibenzyl-amino)-pyrimido-pyrimidine having a melting point of 160–163° C.

(j) With ethylene-imine: 6-chloro-4,8-di-(ethylene-imino)-pyrimido-pyrimidine: this compound assumed a yellowish color at 130° C. and decomposed at about 170° C.

(k) With semicarbazide: 6-chloro-4,8-disemicarbazido-pyrimido-pyrimidine, which did not melt on heating up to 360° C.

EXAMPLE 10

*2,6-Bis-(β-Diethylamino-Ethoxy)-4,8-Bis-(Diethylamino)-Pyrimido-Pyrimidine*

This compound was prepared by reacting 2,6-dichloro-4,8-bis-(diethylamino)-pyrimido-pyrimidine with β-diethyl-amino ethanol in the presence of metallic sodium.

3.4 gm. (0.01 mol) 2,6-dichloro-4,8-bis-(diethyl-amino)-pyrimido-pyrimidine were refluxed with a solution of 0.5 gm. sodium metal in 35 gm. of β-diethylamino-ethanol for three hours, whereby no visible change took place. The reaction mixture was admixed with 400 cc. water. The mixture was acidified by adding concentrated hydrochloric acid, purified with animal charcoal and filtered. Concentrated ammonia was added to the filtrate, whereby the reaction product precipitated in the form of a heavy oil. It was separated from the solution by decanting. On adding water thereto and allowing the mixture to stand for some time while cooling, the compound solidified. It was filtered off on a vacuum filter and dried in a vacuum at room temperature. Yield: 3.2 gm. corresponding to 64% of the theoretical yield. For analytical purposes, the compound was purified by dissolving it in petroleum ether, treating the solution with animal charcoal, and slowly evaporating the solvent. A colorless, soft mass having a melting point of 35.5–37.0° C. was obtained.

Analysis.—$C_{26}H_{48}O_2N_8$; molecular weight: 504.7. Calculated: 61.87% C; 9.58% H; 22.21% N. Found: 61.83% C; 9.53% H; 22.56% N.

The starting material, 2,6-dichloro-4,8-bis-(diethylamino)-pyrimido-pyrimidine, was obtained by reacting 2,4,6,8-tetrachloro-pyrimido-pyrimidine with diethylamine.

Using a procedure analogous to that described above, 2,6-bis-($\beta$-diethylamino-ethoxy) - 4,8 - dipiperidyl-pyrimido-pyrimidine, melting point 60–61° C., was obtained from 2,6-dichloro - 4,8 - dipiperidyl-pyrimido-pyrimidine and $\beta$-diethylamino-ethanol.

EXAMPLE 11

6-Chloro-2-Mercapto-4,8-Dimorpholyl-Pyrimido-Pyrimidine

This compound was prepared from 4,6,8-trichloro-2-mercapto-pyrimido-pyrimidine and morpholine.

3.4 gm. (0.04 mol) morpholine were dissolved in 10 cc. dioxane. The resulting solution was added, while cooling, to a solution of 2.7 gm. (0.01 mol) 4,6,8-trichloro-2-mercapto-pyrimido-pyrimidine in 50 cc. dry dioxane. Immediately, a crystalline suspension was formed which was allowed to stand for half an hour and was then admixed with 5 times its volume of water. The precipitated crude reaction product was filtered off on a vacuum filter, washed and dried. Yield: 1.6 gm. corresponding to 43% of the theroetical yield. For analytical purposes, the product was recrystallized twice from glacial acetic acid, whereby a yellow amorphous powder having a melting point of 240° C. was obtained.

Analysis.—$C_{14}H_{17}O_2N_6ClS$; molecular weight: 368.8. Calculated: 45.58% C; 4.64% H. Found: 45.46% C; 4.42% H.

The starting material, 4,6,8-trichloro-2-mercapto-pyrimido-pyrimidine was prepared by refluxing 4,6,8-trihydroxy-2-mercapto-pyrimido-pyrimidine in the form of its sodium salt with phosphorus pentachloride and phosphorus oxychloride.

EXAMPLE 12

6-Chloro-2-Mercapto-4,8-Dipieridyl-Pyrimido-Pyrimidine

This compound was prepared from 4,6,8-trichloro-2-mercapto-pyrimido-pyrimidine and piperidine. The procedure was the same as that described in Example 11, but in place of morpholine, an equimolecular amount of piperidine was used. Yield: 1.1 gm., corresponding to 30% of the theoretical yield. On recrystallizing the crude reaction product twice from butanol, an orange-colored amorphous powder having a melting point of 242–243° C. was obtained.

Analysis.—$C_{16}H_{21}N_6ClS$; molecular weight: 364.7. Calculated: 52.70% C; 5.80% H. Found: 52.13% C: 5.72% H.

EXAMPLE 13

6-Methyl Mercapto-2,4-Dimorpholyl-Pyrimido-Pyrimidine

This compound was prepared from 6-methyl mercapto-2,4-dichloro-pyrimido-pyrimidine and morpholine.

2.6 gm. (0.03 mol) morpholine were poured into a solution of 1 gm. (0.04 mol) 6-methyl mercapto-2,4-dichloro-pyrimido-pyrimidine, having a melting point of 100–103° C., in 100 cc. of dioxane, while stirring. The mixture was allowed to stand for about 14 hours. 100 cc. of water were added and the resulting solution was concentrated by evaporation in a vacuum. The precipitated yellow flakes were filtered off on a vacuum filter, washed and dried. Yield: 0.6 gm. corresponding to 48% of the theoretical yield. For analytical purposes the compound was recrystallized four times from methanol. Yellow, small, irregular crystals melting at 130–132° C. were obtained.

Analysis.—$C_{15}H_{20}O_2N_6S$; molecular weight: 348.4. Calculated: 48.26% C; 5.78% H. Found: 49.07% C; 5.32% H.

The starting material, 6-methyl mercapto-2,4-dichloro-pyrimido-pyrimidine, was obtained by refluxing the sodium salt of 6-methyl mercapto-2,4-dihydroxy-pyrimido-pyrimidine and phosphorus pentachloride in phosphorus oxychloride.

EXAMPLE 14

2,6-Diethoxy-4,8-Bis-($\beta$-Diethylamino-Ethylamino)-Pyrimido-Pyrimidine

This compound was prepared by reacting 2,6-dichloro-4,8 - bis - ($\beta$-diethylamino - ethylamino) - pyrimido - pyrimidine with sodium ethylate.

4.3 gm. (0.01 mol) 2,6-dichloro-4,8-bis-($\beta$-diethylamino ethylamino)-pyrimido-pyrimidine were heated for one hour at 190–200° C. in a sealed thick-walled glass tube with 50 cc. of an absolute ethanolic solution of sodium alcoholate (0.02 mol). After cooling, filtering off the precipitated sodium chloride on a vacuum filter and washing said sodium chloride with absolute ethanol, the ethanol was evaporated in a vacuum. The remaining pyrimido-pyrimidine compound was first obtained in oily form. The oil solidified on admixture with 200 cc. of ice water. It was triturated with water in a mortar, filtered on a vacuum filter, washed and dried in a vacuum at room temperature. Yield: 4.1 gm. (92% of the theoretical yield). The compound was purified by reprecipitating it four times from hot dilute hydrochloric acid and recrystallizing it from petroleum ether. Small colorless needles having a melting point of 78.0–78.5° C. were obtained.

Analysis.—$C_{22}H_{40}O_2N_8$; molecular weight: 448.6. Calculated: 58.92% C; 8.92% H; 24.99% N. Found: 59.13% C; 8.86% H; 24.70% N.

The starting material, 2,6-dichloro-4,8-bis($\beta$-diethylamino-ethylamino)-pyrimido-pyrimidine, was obtained by reacting 2,4,6,8-tetrachloro-pyrimido-pyrimidine with $\beta$-diethylamino ethylamine.

EXAMPLE 15

2,6-Dihydroxy-4,8-Diamino-Pyrimido-Pyrimidine

This compound was prepared by reacting 2,6-dichloro-4,8-diamino-pyrimido-pyrimidine with concentrated sulfuric acid.

30 cc. concentrated sulfuric acid were poured over 2.3 gm. (0.01 mol) 2,6-dichloro-4,8-diamino-pyrimido-pyrimidine; hydrogen chloride was evolved. The mixture was heated to 50° C. for 30 minutes. After dilution with 120 cc. water, the resulting solution was heated, filtered, and subsequently allowed to stand at 0° C. for several hours. The precipitated sulfate of 2,6-dihydroxy-4,8-diamino-pyrimido-pyrimidine was obtained in long, clustered, interlaced, colorless needles which were filtered off on a vacuum filter. About 1 gm. of these needles was obtained. The free 2,6-dihydroxy-4,8-diamino-pyrimido-pyrimidine was prepared therefrom by dissolving the sulfate in 100 cc. of hot water and precipitating the free base by neutralizing the solution with ammonia. The precipitate was a microcrystalline, colorless powder.

Analysis.—$C_6H_6O_2N_6$; molecular weight: 194.2. Calculated: 37.11% C; 3.11% H. Found: 36.22% C; 3.70% H.

EXAMPLE 16

4,8-Diamino-Pyrimido-Pyrimidine Compounds

These compounds were prepared by reacting 4,8-dichloro-pyrimido-pyrimidine with various amino-compounds in the following manner:

Four times the molecular amount of the corresponding amino compound, if required in solution in dioxane, was poured into a solution of 4,8-dichloro-pyrimido-pyrimidine in dioxane. The starting material was obtained by refluxing the sodium salt of 4,8-dihydroxy-pyrimido-pyrimidine with phosphorus pentachloride in phosphorus oxychloride. It had a melting point of 232° C.

The reaction mixture of 4,8-dichloro-pyrimido pyrimidine and the corresponding amino compound was admixed with water, whereby the desired 4,8-diamino-pyrimido-pyrimidine was precipitated. Its yield was determined. To purify the precipitate for analytical purposes, it was reprecipitated from dilute hydrochloric acid and recrystallized from a suitable solvent as indicated hereinafter.

(a) 4,8-dimorpholyl-pyrimido-pyrimidine was obtained from 4,8-dichloro-pyrimido-pyrimidine and morpholine. The yield was 98% of the theoretical yield. The compound was obtained in the form of very small, colorless prisms which have a melting point of 197–198° C., after recrystallization from benzene.

(b) 4,8-dipiperidyl-pyrimido-pyrimidine was obtained from 4,8-dichloro-pyrimido-pyrimidine and piperidine. The yield was 93% of the theoretical yield. On recrystallization from methanol, colorless bright flakes melting at 132–134° C. were obtained.

(c) 4,8-dianilino-pyrimido-pyrimidine was obtained from 4,8-dichloro-pyrimido-pyrimidine and aniline. The yield was 93% of the theoretical yield. On recrystallization from dimethyl formamide, faintly yellowish, small needles melting at 257–258° C. were obtained.

(d) 4,8-diamino-pyrimido-pyrimidine was prepared by reacting 4,8-dichloro-pyrimido-pyrimidine with ammonia. The yield was 99% of the theoretical yield. On reprecipitation from dilute hydrochloric acid, very small, colorless needles, which did not melt at temperatures up to 360° C., were obtained.

(e) 4,8-bis-(methylamino)-pyrimido-pyrimidine was prepared from 4,8-dichloro-pyrimido-pyrimidine and methylamine. The yield was 92% of the theoretical yield. On recrystallization from water, a colorless, crystalline powder melting at 265° C. was obtained.

(f) 4,8-bis-(dimethylamino)-pyrimido-pyrimidine was obtained by reacting 4,8-dichloro-pyrimido-pyrimidine with dimethylamine. The yield was 97% of the theoretical yield. On recrystallization from water, bright needles melting at 115° C. were obtained.

(g) 4,8-dihydrazino-pyrimido-pyrimidine was obtained by reacting 4,8-dichloro-pyrimido-pyrimidine with hydrazine. The yield was 93% of the theoretical yield. After reprecipitation from dilute hydrochloric acid, an ivory-colored, microcrystalline powder consisting of very small needles and melting at 226° C. was obtained.

(h) 4,8-bis-(N,N'-diphenyl-guanidyl)-pyrimido-pyrimidine was prepared from 4,8-dichloro-pyrimido-pyrimiden and N,N'-diphenyl guanidine. The yield was 80% of the theoretical yield. On reprecipitation from dilute hydrochloric acid, the compound was obtained in the form of a yellow, microcrystalline powder which sintered at 200° C. and had a melting point of 245° C.

(i) 4,8-di-(β-hydroxy-ethylamino)-pyrimido-pyrimidine was prepared from 4,8-dichloro-pyrimido-pyrimidine and β-hydroxy ethylamine. The yield of the analytically pure compound was 72.2% of the theoretical yield. On recrystallization from methanol, colorless rectangular leaflets and prisms having a melting point of 204–205° C. were obtained.

(j) 4,8-di-(N-hydroxy-ethyl-p-nitro-anilino)-pyrimido-pyrimidine was obtained from 4,8-dichloro-pyrimido-pyrimidine and N-hydroxy ethyl-p-nitro aniline. The yield was 73% of the theoretical yield. On recrystallization from dimethyl formamide, the compound was obtained in the form of a yellow, amorphous powder having a melting point of 265–267° C.

(k) 4,8 - di - (methyl-ethanol-amino)-pyrimido-pyrimidine, melting point 162–165° C., was obtained from 4,8-dichloro-pyrimido-pyrimidine and methyl-ethanol amine.

(l) 4,8 - bis - (diethanolamino) - pyrimido - pyrimidine, melting point 156° C., was obtained from 4,8-dichloro-pyrimido-pyrimidine and diethanolamine.

(m) 4,8-di-(ethylene-imino)-pyrimido-pyrimidine, no melting point up to 350° C., was obtained from 4,8-dichloro-pyrimido-pyrimidine and ethyleneimine.

EXAMPLE 17

2,6-Dimorpholyl-4,8-Di-(Ethyl-Mercapto)-Pyrimido-Pyrimidine

This compound was obtained from 2,6-dichloro-4,8-di-(ethyl-mercapto)-pyrimido-pyrimidine and morpholine.

3.2 gm. (0.01 mol) 2,6-dichloro-4,8-di-(ethyl-mercapto)-pyrimido-pyrimidine, obtained as described above, were heated in a sealed thick-walled glass tube at 200° C. for 2 hours with 20 cc. morpholine, 20 cc. water, and 1 cc. copper sulfate solution saturated in the cold. The reaction mixture was allowed to cool, admixed with about 200 cc. water and acidified with concentrated hydrochloric acid. The undissolved 2,6-dimorpholyl-4,8-di-(ethyl-mercapto)-pyrimido-pyrimidine was filtered off on a vacuum filter, washed, and dried at 110° C. Yield: 1.3 gm., corresponding to 31% of the theoretical yield. For analytical purposes the compound was recrystallized twice from dimethyl formamide whereby orange-colored, microcrystalline prisms having a melting point of 293–295° C. were obtained.

Analysis.—$C_{18}H_{26}O_2N_6S_2$; molecular weight: 422.6. Calculated: 51.16% C; 6.20% H. Found: 51.06% C; 6.31% H.

EXAMPLE 18

6-Carboxy-Methyl-Mercapto-4,8-Di-Propylamino-Pyrimido-Pyrimidine

This compound was prepared by reacting 6-chloro-4,8-di-propylamino-pyrimido-pyrimidine with thioglycolic acid in the presence of pyridine.

2.8 gm. (0.01 mol) of 6-chloro-4,8-di-propylamino-pyrimido-pyrimidine having a melting point of 88–90° C. were heated at 200° C. for 2 hours with 0.2 gm. (0.1 mol) thioglycolic acid and 9.7 gm. (0.1 mol) pyridine in a sealed heavy-walled glass tube. The reaction mixture was removed from the tube by rinsing with 150 cc. water. 6 - carboxy - methyl - mercapto - 4,8 - di - propylamino-pyrimido-pyrimidine was precipitated from the aqueous solution in the form of a brown precipitate which was initially of pasty consistency, by acidifying the aqueous solution. Yield: 3.2 gm., corresponding to 95% of the theoretical yield. For analytical purposes the compound was reprecipitated twice from dilute sodium hydroxide solution and then recrystallized twice from a small amount of methanol. Brownish, small prisms having a melting point of 172–174° C. were obtained.

Analysis.—$C_{14}H_{20}O_2N_6S$; molecular weight: 336.4. Calculated: 49.98% C; 5.99% H. Found: 50.13% C; 6.02% H.

The starting material, 6-chloro-4,8-di-propylamino-pyrimido-pyrimidine, was obtained by reacting 4,6,8-trichloro-pyrimido-pyrimidine with propylamine.

EXAMPLE 19

2,4,6,8-Tetraamino-Pyrimido-Pyrimidine Compounds

These compounds were obtained by reacting the corresponding 2,6 - dichloro - 4,8 - diamino - pyrimidopyrimidine compounds with various amines at elevated temperatures, as described hereinafter.

(a) 2,6 - bis - (diethanol amino) - 4,8 - dipiperidyl-pyrimido-pyrimidine: 36.7 gm. (0.1 mol) 2,6-dichloro-4,8-dipiperidyl-pyrimido-pyrimidine having a melting point of 241–242° C. were heated to 200° C. with 100 gm. diethanol amine and the mixture was kept at said temperature for 10 minutes. After cooling, about 500 cc. of water were added to the reaction mixture, whereby the reaction product precipitated out as a viscous mass. After decanting the water, said mass was triturated with a small amount of acetone, whereby a solid-yellow precipitate was formed. Yield: 26.5 gm., corresponding to 52.4% of the theoretical yield. For analytical purposes the compound was recrystallized four times from acetic acid ethyl ester, whereby dark yellow, fine, small needles having a melting point of 162–163° C. were obtained.

Analysis.—$C_{24}H_{40}O_4N_8$; molecular weight: 504.6. Calculated: 57.12% C; 7.99% H; 22.21% N. Found: 57.16% C; 7.83% H; 22.26% N.

The starting material, 2,6-dichloro-4,8-dipiperidyl-pyrimido-pyrimidine, was prepared by reacting 2,4,6,8-tetrachloro-pyrimido-pyrimidine with piperidine at room temperature.

Other 2,4,6,8-tetraamino-pyrimido-pyrimidine compounds were obtained from various 2,6-dichloro-4,8-diamino-pyrimido-pyrimidine compounds by using other amines in place of diethanolamine and proceeding in the same manner as described under (a).

(b) 2,6 - bis - (diethanolamino) - 4,8 - bis - (diethyl-amino)-pyrimido-pyrimidine having a melting point of 167–168° C. was obtained by reacting 2,6-dichloro-4,8-bis-(diethylamino)-pyrimido-pyrimidine with diethanolamine.

(c) 2,6 - bis - (diethanolamino) - 4,8 - dipyrrolidyl-pyrimido-pyrimidine having a melting point of 186–187° C. was obtained by reacting 2,6-dichloro-4,8-dipyrrolidino-pyrimido-pyrimidine with diethanol amine.

(d) 2,6 - bis - (diethanolamino) - 4,8 - bis - (diallyl-amino)-pyrimido-pyrimidine having a melting point of 110° C. was obtained by reacting 2,6-dichloro-4,8-bis-(diallylamino)-pyrimido-pyrimidine with diethanolamine.

(e) 2,6 - bis - (diethanolamino) - 4,8 - bis - (dimethyl-amino)-pyrimido-pyrimidine having a melting point of 182–183° C. is obtained by reacting 2,6-dichloro-4,8-bis-(dimethylamino)-pyrimido-pyrimidine with diethanol-amine.

(f) 2,6 - bis - (diethanolamino) - 4,8 - bis - (dibutyl-amino)-pyrimido-pyrimidine having a melting point of 124–126° C. was obtained by reacting 2,6-dichloro-4,8-bis-(dibutylamino)-pyrimido-pyrimidine with diethanol-amine.

(g) 2,6 - di - (methyl - ethanol - amino) - 4,8 - di-piperidyl-pyrimido-pyrimidine, which starts to sinter at 114° C. and melts at 122–124° C., was obtained by reacting 2,6-dichloro-4,8-dipiperidyl-pyrimido-pyrimidine with methyl-ethanol-amine.

(h) 2,6 - di - (propyl - ethanol - amino) - 4,8 - di-morpholyl-pyrimido-pyrimidine having a melting point of 138–139° C. was obtained by reacting 2,6-dichloro-4,8-dimorpholyl-pyrimido-pyrimidine with propyl-ethanol-amine.

(i) 2,6 - bis - (diisopropanol - amino) - 4,8 - di-piperidyl-pyrimido-pyrimidine having a melting point of 182–183° C. was obtained by reacting 2,6-dichloro-4,8-piperidyl-pyrimido-pyrimidine with diisopropanol-amine.

(j) 2,6 - di - (methyl - ethanol - amino) - 4,8 - di-(dodecyl-ethanol-amino)-pyrimido-pyrimidine having a melting point of 88–90° C. was obtained by reacting 2,6-dichloro - 4,8 - di - (dodecyl - ethanol - amino) - pyrimido-pyrimidine with methyl-ethanol-amine.

(k) 2,6 - bis - (diethanolamino) - 4,8 - dimorpholyl-pyrimido-pyrimidine having a melting point of 202–204° C. was obtained by reacting 2,6-dichloro-4,8-dimorpholyl-pyrimido-pyrimidine with diethanol amine.

EXAMPLE 20

*2,4,6,8-Tetraamino-Pyrimido-Pyrimidine Compounds*

These compounds were prepared by reacting the corresponding 2,6 - dichloro - 4,8 - diamino - pyrimidopyrimidine compounds with various amines at elevated temperature under pressure, as described in detail hereinafter.

(a) 2,6 - dimorpholyl - 4,8 - di - (ethyl - ethanol-amino)-pyrimido-pyrimidine: 7.6 gm. (0.02 mol) 2,6-dichloro - 4,8 - di - (ethyl - ethanol - amino) - pyrimido-pyrimidine were heated with 20 cc. morpholine at 200° C. for one hour in a sealed thick-walled glass tube. The reaction mixture was diluted with 200 cc. water. Crude 2,6 - dimorpholyl - 4,8 - di - (ethyl ethanol - amino)-pyrimido-pyrimidine was precipitated in the form of a yellow, amorphous solid. It was filtered off on a vacuum filter, washed, and dried at 110° C. Yield: 8.7 gm., corresponding to 91% of the theoretical yield. For analytical purposes the compound was recrystallized four times from methanol. The resulting light yellow, microcrystalline, small needles were dried at 130° C./0.1 mm. Their melting point was 190–191° C.

Analysis.—$C_{22}H_{36}O_4N_8$; molecular weight: 476.6. Calculated: 55.44% C; 7.61% H; 23.52% N. Found: 55.42% C; 7.67% H; 23.32% N.

In the same manner as described above under (a), but using various other amines, the following new 2,4,6,8-tetra-amino-pyrimido-pyrimidine compounds were prepared:

(b) 2,6 - dimorpholyl - 4,8 - di - (propyl - ethanol-amino)-pyrimido-pyrimidine having a melting point of 41-143° C. was obtained by reacting 2,6-dichloro-4,8-di-(propyl-ethanol-amino)-pyrimido-pyrimidine with morpholine.

(c) 2,6 - dimorpholyl - 4,8 - di - (methyl - ethanol-amino)-pyrimido-pyrimidine having a melting point of 207–209° C. was obtained by reacting 2,6-dichloro-4,8-di-methyl-ethanol-amino)-pyrimindo-pyrimidine with morpholine.

(d) 2,6 - dimorpholyl - 4,8 - bis - (diethanolamino)-pyrimido-pyrimidine having a melting point of 209–210° C. was obtained by reacting 2,6-dichloro-4,8-bis-(diethanolamino)-pyrimido-pyrimidine with morpholine.

(e) 2,6 - dipiperidyl - 4,8 - bis - (diethanolamino)-pyrimido-pyrimidine having a melting point of 182–184° C. was obtained by reacting 2,6-dichloro-4,8-bis-(diethanolamino)-pyrimido-pyrimidine with piperidine.

(f) 2,6 -bis - (diethanolamino) - 4,8 - bis - (diethanolamino)-pyrimido-pyrimidine having a melting point of 18–160° C. was obtained by reacting 2,6-dichloro-4,8-bis-(diethanolamino)-pyrimido-pyrimidine with diethyl-amine.

(g) 2,6 - dimorpholyl - 4,8 - bis - (dimethylamino)-pyrimido-pyrimidine having a melting point of 92–193° C. was obtained by reacting 2,6-dichloro-4,8-bis-(dimethylamino)-pyrimido-pyrimidine with morpholine.

(h) 2,6 - dipiperidyl - 4,8 - bis - (isoamylamino)-pyrimido-pyrimidine having a melting point of 192–194° C. was obtained by reacting 2,6-dichloro-4,8-bis-(isoamylamino)-pyrimido-pyrimidine with piperidine.

(i) 2,6 - dipiperidyl - 4,8 - dipyrrolidyl - pyrimido-pyrimidine having a melting point of 254–256° C. was obtained by reacting 2,6-dichloro-4,8-dipyrrolidyl-pyrimido-pyrimidine with piperidine.

(j) 2,6-dipiperidyl - 4,8 - di - (benzyl - ethanol-amino)-pyrimido-pyrimidine having a melting point of 161–163° C. was obtained by reacting 2,6-dichloro-4,8-di-(benzyl-ethanol-amino)-pyrimido-pyrimidine with piperidine.

EXAMPLE 21

*4,6,8-Triamino-Pyrimido-Pyrimidine Compounds*

These compounds were prepared by reacting 4,6,8-tri-chloro-pyrimido-pyrimidine with various amines at elevated temperatures, if desired at elevated pressures, and in the presence of copper salts as described in detail hereinafter.

(a) 4,6,8-tri-(methylamino)-pyrimido-pyrimidine: 4.8 gm. (0.02 mol) 4,6,8-trichloro-pyrimido-pyrimidine were heated to 200° C. for about 2 hours with 50 cc. of an absolute alcohol solution of methylamine (about 0.2 mol) and 0.1 gm. copper sulfate in a sealed thick-walled glass tube. The reaction mixture was diluted with about 300 cc. water, filtered, and concentrated by evaporation to ⅓ of its volume. After allowing the mixture to stand for several hours the crude 4,6,8-tri-(methylamino)-pyrimido-pyrimidine was precipitated in the form of a brown solid similar in texture to cotton. Yield: 4 gm., corresponding to 91% of the theoretical yield. For analytical purposes the compound was recrystallized three times from water and the resulting colorless very fine, wool-like fibers were dried at 130° C./0.1 mm. Melting point: 188–189° C.

Analysis.—$C_9H_{13}N_7$; molecular weight: 219.3. Calculated: 49.31% C; 5.97% H. Found: 49.00% C; 5.79% H.

The following 4,6,8-triamino-pyrimido-pyrimidine compounds were prepared by following the procedure described above under (a), but using in place of methylamine other amines as indicated.

(b) With ethylamine: 4,6,8-tri-(ethylamino)-pyrimido-pyrimidine; melting point 83–85° C.

(c) With propylamine: 4,6,8-tri-(propylamino)-pyrimido-pyrimidine; melting point 84–86° C.

(d) With dimethylamine: 4,6,8-tri-(dimethylamino)-pyrimido-pyrimidine; melting point 92–93° C.

(e) With β-hydroxy-ethylamine: 4,6,8-tri-(β-hydroxyethylamino)- pyrimido pyrimidine; melting point 83–85° C.

(f) With morpholine: 4,6,8-trimorpholyl-pyrimido-pyrimidine; melting point 182–184° C.

(g) With aniline: 4,6,8-trianilino-pyrimido-pyrimidine; melting point 203–204° C.

(h) With p-chloro-aniline: 4,6,8-tri-(p-chloro-anilino)-pyrimido-pyrimidine; melting point 274–275° C.

(i) With o-methoxy-aniline: 4,6,8-tri-(o-methoxy-anilino)-pyrimido-pyrimidine; melting point 214–215° C.

EXAMPLE 22

*6-Alkoxy-4,8-Dimorpholyl-Pyrimido-Pyrimidine Compounds*

These compounds were prepared by reacting 6-chloro-4,8-dimorpholino-pyrimido-pyrimidine with the corresponding alcoholate solutions, if required at elevated pressure, as described below.

(a) 6-ethoxy-4,8-dimorpholyl-pyrimido-pyrimidine: 6.7 gm. (0.02 mol) 6-chloro-4,8-dimorpholyl-pyrimidopyrimidine were heated to 180° C. for 2 hours with 50 cc. of a sodium alcoholate solution containing 0.5 gm. (0.022 mol) sodium in a sealed thick-walled glass tube. The crude reaction product was removed from said tube by rinsing with a small amount of water and then recrystallized, after it had been filtered off on a vacuum filter, from a mixture of ethanol and water (1:4). Yield: 5.9 gm., corresponding to 85% of the theoretical yield. For analyltical purposes the compound was recrystallized twice from about 100 cc. ethanol, reprecipitated from hot 0.5 N hydrochloric acid, and again recrystallized from ethanol. The resulting almost colorless, very short, rhombic prisms were dried at 65° C./0.1 mm. Melting point: 129–132° C.

Analysis.—$C_{16}H_{22}O_3N_6$; molecular weight: 346.4. Calculated: 55.48% C; 6.40% H. Found: 55.11% C; 6.20% H.

By proceeding in the same manner as described above under (a) but using other sodium alcoholate solutions as indicated below, the following 6-alkoxy-4,8-dimorpholyl-pyrimido-pyrimidine compounds were obtained:

(b) With sodium butanolate: 6-butoxy-4,8-dimorpholyl-pyrimido-pyrimidine; melting point 109–111° C.

(c) With sodium β-diethylamino-ethanolate: 6-(β-diethylamino-ethoxy) - 4,8 - dimorpholyl - pyrimido - pyrimidine; melting point 100–103° C.

(d) With sodium β-ethoxy-ethanolate: 6-(β-ethoxy-ethoxy)-4,8-dimorpholyl-pyrimido-pyrimidine; melting point 111–112° C.

(e) With sodium β-propoxy-ethanolate: 6-(β-propoxyethoxy)-4,8 - dimorpholyl - pyrimido - pyrimidine; melting point 122–123° C.

EXAMPLE 23

*2,6-Dimorpholyl-4,8-Di-(β-Propoxy-Ethoxy)-Pyrimido-Pyrimidine*

This compound was obtained by reacting 2,6-dichloro-4,8-di-(β-propoxy-ethoxy)-pyrimido-pyrimidine with morpholine.

8.1 gm. (0.02 mol) 2,6-dichloro-4,8-di-(β-propoxyethoxy)-pyrimido-pyrimidine having a melting point of 78–81° C. were heated to 100° C. for 2 hours with 20 cc. morpholine in a sealed thick-walled glass tube. The reaction product was removed from the tube by rinsing with 200 cc. water, filtered off on a vacuum filter, washed and dried. Yield: 9.9 gm., corresponding to 98% of the theoretical yield. For analytical purposes the compound was reprecipitated from N hydrochloric acid and recrystallized twice from a mixture of methanol and water (1:4). A bright yellow, microcrystalline powder was formed. Melting point: 155–157° C.

Analysis.—$C_{24}H_{38}O_6N_6$; molecular weight: 506.6. Calculated: 56.90% C; 7.56% H. Found: 56.4% C; 7.47% H.

The starting material, 2,6-dichloro-4,8-di-(β-propoxyethoxy)-pyrimido-pyrimidine, was prepared by reacting 2,4,6,8-tetrachloro-pyrimido-pyrimidine with a solution of sodium metal in the monopropyl ether of ethylene glycol, while cooling.

EXAMPLE 24

*Preparation of Various 2,4,6,8-Tetraamino-Pyrimido-Pyrimidines From the Corresponding 2,6-Dichloro-4,8-Diamino-Pyrimido-Pyrimidines by Reaction With the Corresponding Amines at Elevated Temperatures*

(a) 2,6 - bis - (diethanolamino) - 4,8 - di - (4' - methyl-piperidyl)-pyrimido-pyrimidine: 4.0 gm. (0.01 mol) 2,6-dichloro-4,8-di-(4'-methyl-piperidyl)-pyrimido-pyrimidine (melting point 166–167° C., obtained from 2,4,6,8-tetrachloro-pyrimido-pyrimidine and 4-methyl-piperidine in dioxan at room temperature) were admixed with 16 gm. (about 0.15 mol) diethanolamine and the mixture was heated for 45 minutes at 190–195° C. A honey-colored melt was obtained which was taken up in about 150 cc. water. The raw reaction product separated out as an initially greasy yellow mass which, however, solidified after standing for some time. The solidified mass was separated by vacuum filtration, triturated with a small amount of water in a mortar, again vacuum filtered, washed with water and dried. The yield was 5.0 gm. (94% of theory). For analysis, the product was dissolved in dilute acetic acid and reprecipitated from this solution by adding sodium acetate. Thereafter, it was recrystallized from ethylene chloride. Deep yellow, partly rhombic shaped, flat prisms having a melting point of 174–175° C. were obtained.

Analysis.—$C_{26}H_{44}N_8O_4$: molecular weight: 532.7. Calculated: 58.62% C; 8.33% H. Found: 58.90% C; 8.66% H.

Following a procedure analogous to that described under (a) above, the following 2,4,6,8-tetraamino-pyrimido-pyrimidines were prepared from the indicated starting materials:

(b) 2,6 - bis - (diethanolamino) - 4,8 - di - (3' - methyl-piperidyl)-pyrimido-pyrimidine, melting point 188–190° C., from 2,6-dichloro-4,8-di-(3'-methyl-piyeridyl)-pyrimido-pyrimidine (melting point 181–183° C.) and diethanolamine.

(c) 2,6 - bis - (diethanolamino) - 4,8 - di - (2' - methyl-piperidyl)-pyrimido-pyrimidine, melting point 208–209° C., from 2,6-dichloro-4,8-di-(2'-methyl-piperidyl)-pyrimido-pyrimidine (melting point 144–145° C.) and diethanolamine.

(d) 2,6 - bis - (diethanolamino) - 4,8 - bis - (2',6' - dimethyl-morpholyl) - pyrimido - pyrimidine, melting point 181–183° C., from 2,6-dichloro-4,8-bis-(2',6'-dimethyl-morpholyl)-pyrimido-pyrimidine (melting point 197–199° C.) and diethanolamine.

(e) 2,6 - bis - (diethanolamino) - 4,8 - bis - (2',6' - dimethyl piperidyl)-pyrimido-pyrimidine, melting point 223–226° C., from 2,6-dichloro-4,8-bis-(2',6'-dimethyl-piperidyl)-pyrimido-pyrimidine (melting point 160–162° C.) and diethanolamine.

(f) 2,6 - bis - (diethanolamino) - 4,8 - bis - (1',2',5',6'-tetrahydro-pyridyl)-pyrimido-pyrimidine, melting point 150–152° C., from 2,6-dichloro-4,8-bis-(1',2',5',6'-tetrahydro-pyridyl)-pyrimido-pyrimidine (melting point 209–211° C., decomposition) and diethanolamine.

(g) 2,6 - bis - (diethanolamino) - 4,8 - di - (3' - hydroxy-piperidyl)-pyrimido-pyrimidine, melting point 202–204° C., from 2,6-dichloro-4,8-di-(3'-hydroxy-piperidyl)-pyrimido-pyrimidine (melting point 208–210° C.) and diethanolamine.

(h) 2,6 - bis - (diethanolamino) - 4,8 - di - (2' - methyl-morpholyl)-pyrimido-pyrimidine, melting point 183–185° C., from 2,6-dichloro-4,8-di-(2'-methyl-morpholyl)-pyrimido-pyrimidine (melting point 182–184° C.) and diethanolamine.

(i) 2,6 - bis - (diisopropanolamino) - 4,8 - dimorpholyl-pyrimido-pyrimidine, melting point 216–218° C., from 2,6 - dichloro-4,8-dimorpholyl-pyrimido-pyrimidine (melting point 276–277° C.) and disopropanolamine.

(k) 2,6 - d - (ethanol - isopropanol - amino) - 4,8 - dimorpholyl-pyrimido-pyrimidine, melting point 159–161° C., from 2,6-dichloro-4,8-dimorpholyl-pyrimido-pyrimidine and ethanol-isopropanol-amine.

(l) 2,6 - di - [ethanol - butanol - (2') - amino] - 4,8-dimorpholyl-pyrimido-pyrimidine, melting point 173–175° C., from 2,6-dichloro-4,8-dimorpholyl-pyrimido-pyrimidine and ethanol-butanol-(2')-amine.

(m) 2,6 - di - [ethanol - butanol - (2') - amino] - 4,8-dipiperidyl-pyrimido-pyrimidine, melting point 173–175° C., from 2,6-dichloro-4,8-dipiperidyl-pyrimido-pyrimidine (melting point 245–247° C.) and ethanol-butanol-(2')-amine.

(n) 2,6 - di - (methyl-glucamino) - 4,8 - dimorpholyl-pyrimido-pyrimidine, melting point 191–193° C., from 2,6-dichloro-4,8-dimorpholyl - pyrimido - pyrimidine and methyl-glucamine.

(o) 2,6 - bis - (diethanolamino) - 4,8 - di - (hexamethyleneimino)-pyrimido-pyrimidine, melting point 208–209° C., from 2,6-dichloro-4,8-di - (hexamethyleneimino) - pyrimido-pyrimidine (melting point 170–172° C.) and diethanolamine.

(p) 2,6 - bis - (diethanolamino) - 4,8 - bis - (1',2',3',4'-tetrahydro-quinolyl) - pyrimido - pyrimidine, melting point 205–208° C., from 2,6-dichloro-4,8-bis-(1',2',3',4'-tetrahydro-quinolyl)-pyrimido-pyrimidine (melting point 244–246° C.) and diethanolamine.

EXAMPLE 25

*Preparation of Various 2,4,6,8-Tetraamino-Pyrimido-Pyrimidines From 2,6-Dichloro-4,8-Diamine-Pyrimido-Pyrimidine By Heating Them Under Reflux With the Corresponding Amines*

(a) Preparation of 2,6-di-(3'-methyl-piperidyl)-4,8-bis-(di-ethanolamino)-pyrimido-pyrimidine: 4.1 gm. (0.01 mol) 2,6-dichloro-4,8-bis-(diethanolamino)-pyrimido-pyrimidine (melting point 189–190° C.) were refluxed for about one hour with 12 cc. 3-methyl-piperidine. The reaction mixture was then allowed to cool and was taken up in 200 cc. water. The reaction product separated out as a yellow precipitate, while the 3-methyl-piperidine hydrochloride which separated out during refluxing redissolved. After vacuum filtering, washing the filter cake and drying it in vacuo at room temperature the yield of reaction product was 4.6 gm. (86% of theory). For analysis, the product was purified by dissolving it in dilute acetic acid and reprecipitating it from this solution by adding a sodium acetate solution thereto, and then recrystallizing it twice from ethyl acetate. The pure product was obtained in the form of a brilliant yellow microcrystalline powder having a melting point of 138–140° C.

*Analysis.*—$C_{26}H_{44}N_8O_4$; molecular weight: 532.7. Calculated: 58.62% C; 8.33% H. Found: 58.50% C; 8.52% H.

By following a procedure analogous to that described under (a) above, the following 2,4,6,8-tetraamino-pyrimido-pyrimidines were prepared from the starting materials indicated in each case.

(b) 2,6 - di - (4' - methyl-piperidyl) - 4,8 - bis - (diethanolamino)-pyrimido-pyrimidine, melting point 191–193° C., from 2,6-dichloro-4,8-bis-(diethanolamino)-pyrimido-pyrimidine and 4-methyl-piperidine.

(c) 2,6 - di - (2' - methyl - morpholyl) - 4,8 - bis - (di-ethanolamino)-pyrimido-pyrimidine, melting point 161–163° C., from 2,6-dichloro-4,8-bis-(diethanolamino)-pyrimido-pyrimidine and 2-methyl-morpholine.

(d) 2,6 - bis - (2',6' - dimethyl - morpholyl) - 4,8-bis-(diethanolamino)-pyrimido-pyrimidine, melting point 236–238° C., from 2,6-dichloro-4,8-bis-(diethanolamino)-pyrimido-pyrimidine and 2,6-dimethyl-morpholine.

(e) 2,6 - bis - (1',2',5',6' - tetrahydro - pyridyl) - 4,8-bis - (diethyanolamino) - pyrimido - pyrimidine, melting point 171–173° C., from 2,6-dichloro-4,8-bis-(diethanolamino)-pyrimido-pyrimidine and 1,2,5,6-tetrahydro-pyridine.

(f) 2,6 - di - (methyl - ethanol -amino) - 4,8 - di - (N'-methyl - piperazyl) - pyrimido - pyrimidine, melting point 188–189° C., from 2,6-dichloro-4,8-di-(N'-methyl-piperazyl)-pyrimido-pyrimidine (decomposition at about 205° C.) and methyl-ethanol-amine.

(g) 2,4,6,8 - tetra - (N' - methyl - piperazyl) - pyrimido-pyrimidine, melting point 121–123° C., from 2,6-dichloro - 4,8 - di - (N' - methyl - piperazyl) - pyrimido-pyrimidine and N-methyl-piperazine.

(h) 2,6 - di - (N' - methyl - piperazyl) - 4,8 - dipiperidyl-pyrimido-pyrimidine, melting point 130–132° C., from 2,6-dichloro-4,8-dipiperidyl-pyrimido-pyrimidine and N-methyl-piperazine.

EXAMPLE 26

*Preparation of Various 2,6-Dichloro-4,8-Diamino-Pyrimido-Pyrimidines From 2,4,6,8-Tetrachloro-Pyrimido-Pyrimidines By Reaction With the Corresponding Amines at Room Temperature*

(a) Preparation of 2,6 - dichloro - 4,8 - di - (4'-methyl-piperidyl)-pyrimido-pyrimidine: 12 gm. (about 0.12 mol) 4-methyl-piperidine were slowly poured into a solution of 8.1 gm. (0.03 mol) 2,4,6,8-tetrachloro-pyrimido-pyrimidine in 120 cc. dioxane at room temperature (while cooling, if necessary), accompanied by stirring. After all of the 4-methyl-piperidine had been added the reaction mixture was allowed to stand for a short period of time, whereby a crystal suspension was obtained. In order to dissolve out the 4-methyl-piperidine hydrochloride formed as a side product by the reaction, the suspension was taken up in about 400 cc. water. The principal desired reaction product, which was insoluble in the aqueous medium, was separated by vacuum filtration, washed with water and dried. The yield was 10.0 gm. (84% of theory). For purification purposes the raw product was recrystallized twice from ethyl acetate, yielding violet-blue prisms having a melting point of 166–167° C.

Following a procedure analogous to that described under (a) above, the following 2,6-dichloro-4,8-diamino-pyrimido-pyrimidines were prepared from the starting materials indicated in each case.

(b) 2,6 - dichloro - 4,8 - di - (2' - methyl - piperidyl)-pyrimido-pyrimidine, melting point 144–145° C., from 2,4,6,8-tetrachloro-pyrimido-pyrimidine and 2-methyl-piperidine.

(c) 2,6 - dichloro - 4,8 - di - (3' - methyl - piperidyl)-pyrimido-pyrimidine, melting point 181–183° C., from 2,4,6,8-tetrachloro-pyrimido-pyrimidine and 3-methyl-piperidine.

(d) 2,6 - dichloro - 4,8 - bis - (2',6' - dimethyl - piperidyl)-pyrimido-pyrimidine, melting point 160–162° C., from 2,4,6,8-tetrachloro-pyrimido-pyrimidine and 2,6-dimethyl-piperidine.

(e) 2,6 - dichloro - 4,8 - bis - (2',6' - dimethyl - morpholyl)-pyrimido-pyrimidine, melting point 197–199° C., from 2,4,6,8-tetrachloro-pyrimido-pyrimidine and 2,6-dimethyl-morpholine.

(f) 2,6 - dichloro - 4,8 - di - (3' - hydroxy - piperidyl)-pyrimido-pyrimidine, melting point 208–210° C., from 2,4,6,8-tetrachloro-pyrimido-pyrimidine and 3-hydroxy-piperidine.

(g) 2,6 - dichloro - 4,8 - di - (1',2',5',6' - tetrahydropyridyl)-pyrimido-pyrimidine, melting point 209–211° C. (decomposition), from 2,4,6,8-tetrachloro-pyrimido-pyrimidine and 1,2,5,6-tetrahydro-pyridine.

(h) 2,6 - dichloro - 4,8 - di-(2'-methyl-morpholyl)-pyrimido-pyrimidine, melting point 182–184° C., from 2,4,6,8-tetrachloro-pyrimido-pyrimidine and 2-methyl-morpholine.

(i) 2,6 - dichloro - 4,8 - bis - (1',2',3',4'-tetrahydroquinolyl)-pyrimido-pyrimidine, melting point 244–246° C., from 2,4,6,8-tetrachloro-pyrimido-pyrimidine and 1,2,3,4-tetrahydroquinoline.

(k) 2,6 - dichloro - 4,8 - bis - (1',2',3',4' - tetrahydroisoquinolyl)-pyrimido-pyrimidine, melting point 195–197° C., from 2,4,6,8-tetrachloro-pyrimido-pyrimidine and 1,2,3,4-tetrahydro-isoquinoline.

(l) 2,6 - dichloro - 4,8 - di - (methyl - glucamino)-pyrimido-pyrimidine, melting point 175–177° C., from 2,4,6,8-tetrachloro-pyrimido-pyrimidine and methyl-glucamine.

(m) 2,6 - dichloro - 4,8 - di - (4' - sulfamino - anilino)-pyrimido-pyrimidine, which has no sharply defined melting point up to 350° C., from 2,4,6,8-tetrachloro-pyrimido-pyrimidine and 4-sulfamino-aniline.

(n) 2,6 - dichloro - 4,8 - di - (hexamethylene - imino)-pyrimido-pyrimidine, melting point 170–172° C., from 2,4,6,8-tetrachloro-pyrimido-pyrimidine and hexamethylene-imine.

(o) 2,6 - dichloro - 4,8 - di - (N' - methyl - piperazyl)-pyrimido-pyrimidine, which decomposes at about 205° C. without sharply defined melting point, from 2,4,6,8-tetrachloro-pyrimido-pyrimidine and N-methyl-piperazine.

(p) 2,6 - dichloro - 4,8 - di - (5' - ethyl - 2' - methyl-piperidyl)-pyrimido-pyrimidine, melting point 96–98° C., from 2,4,6,8-tetrachloro-pyrimido-pyrimidine and 5-ethyl-2-methyl-piperidine.

EXAMPLE 27

*Preparation of Various 2,4,6,8-Tetraamino-Pyrimido-Pyrimidines from 2,6-Dichloro-4,8-Di-Amino-Pyrimido-Pyrimidines through 2-Chloro-4,6,8-Triamino-Pyrimido-Pyrimidines by Reaction with the Corresponding Amines First at Moderately Elevated Temperatures and Then at Higher Temperatures, if Desired Under Pressure*

(a) Preparation of 2-(diisopropanol-amino)-6-(diethanol-amino)-4,8-dipiperidyl-pyrimido-pyrimidine: 4.4 gm. (0.01 mol) 2-chloro-6-diethanolamino-4,8-dipiperidyl-pyrimido-pyrimidine (melting point 162–164° C., obtained by heating 2,6-dichloro-4,8-dipiperidyl-pyrimido-pyrimidine with diethanolamine for half an hour at 150° C.) were heated for about 1 hour at 190–195° C. together with 15 gm. diisopropanolamine. The melt obtained thereby was taken up in 100 cc. water, whereupon the reaction product separated out as a rapidly solidifying yellow mass. The precipitate was separated by vacuum filtration, triturated with a small amount of water in a mortar, again vacuum filtered, washed with water and dried. The yield was 4.3 gm. 81% of theory). For analysis, the raw product was recrystallized twice from ethylene chlorinde, yielding yellow prisms having a melting point of 172–174° C.

*Analysis.*—$C_{26}H_{44}N_8O_4$; molecular weight: 532.7. Calculated: 58.62% C; 8.33% H. Found: 58.90% C; 8.70% H.

Following a procedure analogous to that described under (a) above, the following additional 2,4,6,8-tetraamino-pyrimido-pyrimidines were prepared from the starting materials indicated in each case.

(b) 2 - (ethanol - isopropanol - amino) - 6 - diethanolamino - 4,8 - dipiperidyl - pyrimido - pyrimidine, melting point 146–148° C., from 2,6-dichloro-4,8-dipiperidyl-pyrimido-pyrimidine, ethanol-isopropanol-amine and diethanolamine.

(c) 2 - (N' - methyl - piperazyl) - 6 - diethanolamino-4,8-dipiperidyl-pyrimido-pyrimidine, melting point 146–148° C., from 2,6-dichloro-4,8-dipiperidyl-pyrimido-pyrimidine, diethanolamine and N-methyl-piperazine.

(d) 2 - dimethylamino - 6 - diethanolamino - 4,8 - dipiperidyl-pyrimido-pyrimidine, melting point 135–137° C., from 2,6-dichloro-4,8-dipiperidyl-pyrimido-pyrimidine, diethanolamine and dimethylamine.

(e) 2 - morpholyl - 6 - diethanolamino - 4,8 - dipiperidyl-pyrimido-pyrimidine, melting point 128–130° C., from 2,6-dichloro-4,8-dipiperidyl-pyrimido-pyrimidine, diethanolamine and morpholine.

(f) 2 - diethanolamino - 4,6,8 - tripiperidyl - pyrimido-pyrimidine, melting point 145–147° C., from 2-chloro-4,6,8-tripiperidyl-pyrimido-pyrimidine (melting point 143–145° C.) and diethanolamine.

(g) 2,6 - bis - (diethanolamino) - 4,8 - dipiperidyl-pyrimido-pyrimidine, melting point 164–166° C., from 2,6-dichloro-4,8-dipiperidyl-pyrimido-pyrimidine and diethanolamine. Melting points of various addition salts of the tetraamino-pyrimido-pyrimidine product:

| | ° C. |
|---|---|
| Hydrochloride | 196–198 |
| Hydrobromide | 187–189 |
| Sulfate | 168–170 |

EXAMPLE 28

*Preparation of 2,4,8-Trimorpholyl-6-Phenyl-Pyrimido-Pyrimidine*

3.1 gm. (0.01 mol) 2,4,8-trichloro-6-phenyl-pyrimido-pyrimidine, melting point 223–225° C., obtained by refluxing 2,4,8 - trihydroxy - 6 - phenyl - pyrimido - pyrimidine with phosphorus pentachloride in phosphorus oxychloride, were heated under reflux with 12 cc. morpholine for 75 minutes. The reaction mixture was then taken up in about 50 cc. water, whereupon the reaction product separated out in the form of a light orange precipitate. The precipitate was separated by vacuum filtration, washed and dried. The yield was 3.9 gm. (84% of theory). For analysis, the raw product was recrystallized twice from isopropanol, yielding orange microcrystalline needles having a melting point of 236–237° C.

*Analysis.*—$C_{24}H_{30}N_7O_3$; molecular weight: 464.6. Calculated: 62.06% C; 6.51% H. Found: 62.45% C; 6.56% H.

EXAMPLE 29

*Preparation of 2-Morpholyl-4,8-Di-(β-Hydroxyethyl-amino)-6-Phenyl-Pyrimido-Pyrimidine*

3.3 gm. (0.01 mol) 2-chloro-4,8-di-(β-hydroxyethylamino)-6-phenyl-pyrimido-pyrimidine, melting point 198–200° C., obtained by reacting 2,6,8-trichloro-6-phenyl-pyrimido-pyrimidine with β-hydroxyethyl-amine in dioxan at room temperature, were refluxed with 15 cc. morpholine for one hour. The reaction mixture was then taken up in about 100 cc. water, whereupon the reaction product rapidly separated out in the form of a light yellow precipitate. The yield was 3.6 gm. (87% of theory). Recrystallized from ethanol, the product was obtained in the form of a light yellow powder composed of microcrystalline needles having a melting point of 244–245° C.

EXAMPLE 30

*Preparation of Various 2,4,8-Triamino-Pyrimido-Pyrimidines from 2-Chloro-4,8-Diamino-Pyrimido-Pyrimidines or 2,4,8-Trichloro-Pyrimido-Pyrimidines by Refluxing with the Corresponding Amines*

(a) Preparation of 2,4,8-trimorpholyl-pyrimido-pyrimidine: 10.1 gm. (0.03 mol) 2-chloro-4,8-dimorpholyl-pyrimido-pyrimidine were refluxed for one hour with 40 cc. morpholine. A clear, reddish-brown solution formed very rapidly. It was allowed to cool, whereby morpholine hydrochloride, a side product of the reaction, separated out as a crystalline precipitate. The mixture was taken up in about 200 cc. water, whereby the morpholine hydrochloride redissolved while 2,4,8-trimorpholyl-pyrimido-pyrimidine precipitated out in the form of a yellow, pasty mass which soon solidified after standing. The solidified precipitate was separated by vacuum filtration, washed and dried. The yield was 11.3 gm. (97% of theory). Recrystallized from a mixture of methanol and ethanol (5:3), the product was obtained in the form of a yellowish amorphous powder having a melting point of 186–189° C.

The same results were obtained when 7.1 gm. (0.03 mol) of 2,4,8-trichloro-pyrimido-pyrimidine were substituted for the 2-chloro-4,8-dimorpholyl-pyrimido-pyrimidine in the above process.

EXAMPLE 31

*Preparation of Various 2,4,6-Triamino-8-Thio-Pyrimido-Pyrimidines*

(a) Preparation of 2,6-bis-(diethanolamino)-4-piperidyl-8-ethylthio-pyrimido-pyrimidine: 4.6 gm. (0.01 mol) 2,6-bis-(diethanolamino)-4,8-di-(ethylthio)-pyrimido-pyrimidine were heated for about three hours at 180° C. in a closed tube with 40 cc. piperidine. After rinsing the reaction mixture thus obtained out of the tube with about 300 cc. water, the reaction product separated out as a pasty, yellowish-brown precipitate. It was immediately reprecipitated once from dilute hydrochloric acid with the aid of ammonia. The yield was 3.0 gm. (63% of theory). For analysis, the raw product was reprecipitated once from 10% acetic acid with the aid of a 10% aqueous solution of sodium acetate and then recrystallized twice from ethylene chloride. The pure product was obtained in the form of microcrystalline needles having a melting point of 143–144° C.

*Analysis.*—$C_{21}H_{35}O_4N_7S$; molecular weight: 481.6. Calculated: 52.37% C; 7.32% H. Found: 52.15% C; 7.15% H.

(b) Preparation of 2,4,6-tris-(diethanolamino)-8-ethylthio-pyrimido-pyrimidine: 4.6 gm. (0.01 mol) 2,6-bis-(diethanolamino)-4,8-di-(ethylthio)-pyrimido-pyrimidine were heated with 15.7 gm. (0.15 mol) diethanolamine for about 1½ hours at 180° C. The melt obtained thereby was taken up in 150 cc. water. After neutralizing the solution with glacial acetic acid and allowing it to stand for several hours, the reaction product precipitated out in the form of a fine yellow precipitate. It was separated by vacuum filtration, washed and dried. The yield was 3.0 gm. (60% of theory). For purification, the raw product was extracted once with a small amount of boiling ethylene chloride and recrystallized once from a mixture of ethylene chloride and acetone (1:1). The pure product was a yellow microcrystalline powder having a melting point of 157–159° C.

*Analysis.*—$C_{20}H_{35}O_6N_7S$; molecular weight: 501.6. Calculated: 47.89% C; 7.03% H. Found: 47.95% C; 7.15% H.

(c) Preparation of 2,4,6-trimorpholyl-8-ethylthio-pyrimido-pyrimidine: Following a procedure analogous to that described under (a) above, 2.6 gm. (56% of theory) 2,4,6-trimorpholyl-8-ethylthio-pyrimido-pyrimidine were obtained from 4.2 gm. (0.01 mol) 2,6-dimorpholyl-4,8-di-(ethylthio)-pyrimido-pyrimidine and about 40 cc. morpholine after reprecipitating the reaction product once from dilute hydrochloric acid. For analysis, the raw product was recrystallized once from aqueous dimethyl-formamide, yielding microcrystalline, light yellow needles having a melting point of 212–214° C.

*Analysis.*—$C_{20}H_{29}N_7O_3S$; molecular weight: 447.6. Calculated: 53.67% C; 6.53% H. Found: 53.15% C; 6.35% H.

(d) Preparation of 2,6-bis-(diethanolamino)-4-morpholyl-8-ethylthio-pyrimido-pyrimidine: Using a procedure analogous to that described under (a) above, 2,6 - bis - (diethanolamino) - 4 - morpholyl - 8 - ethylthiopyrimido-pyrimidine was prepared from 2,6-bis-(diethanolamino)-4,8-di-(ethylthio)-pyrimido-pyrimidine and morpholine. The purified product had a melting point of 166–168° C.

(e) 2,6 - (diethanol - amino) - 4 - pyrolidyl - 8 - ethylthio-pyrimido-pyrimidine, melting point 175–177° C., from 2,6-bis-(diethanol-amino)-4,8-di-(ethylthio)-pyrimido-pyrimidine and pyrrolidine.

EXAMPLE 32

*Preparation of Various 2,4,6,8-Tetraamino-Pyrimido-Pyrimidines*

(a) Preparation of 2,6-bis-(diethanolamino)-4,8-dipiperidyl-pyrimido-pyrimidine: 4.8 gm. (0.01 mol) 2,6-bis - (diethanolamino) - 4 - piperidyl - 8 - ethylthio-pyrimido-pyrimidine were heated with 150 cc. piperidine in a sealed tube for about four hours at 200° C. The clear yellow solution obtained thereby was extensively concentrated by evaporation in vacuo, and the concentrate was taken up in about 150 cc. water. 2,6-bis-(diethanolamino)-4,8-dipiperidyl-pyrimido-pyrimidine precipitated out in the form of a brownish-yellow mass which gradually solidified. The yield was 3.4 gm. (67% of theory). Recrystallized from ethylene chloride, the pure product was obtained in the form of yellow prisms having a melting point of 163–165° C.

The same result was obtained when 4.6 gm. (0.01 mol) 2,6 - bis - (diethanolamino) - 4,8 - di - ethylthio)-pyrimido-pyrimidine were used in place of the indicated amount of 2,6-bis-(di-ethanolamino)-4-piperidyl-8-ethyl-thio-pyrimido-pyrimidine.

The hydrochloride, hydrobromide and sulfate addition salts of the reaction product were prepared by reacting the free base with the corresponding acid. Their melting points were as follows:

| | °C. |
|---|---|
| Hydrochloride | 196–198 |
| Hydrobromide | 184–189 |
| Sulfate | 168–170 |

Using a procedure analogous to that described under (a) above, and refluxing the reaction mixture, if necessary, the following tetraamino-pyrimido-pyrimidines were produced from the starting materials indicated in each case.

(b) 2,4,6 - tris - (diethanolamino) - 8 - piperidyl-pyrimido-pyrimidine, melting point 174–175° C., from 2,4,6-tris-(diethanolamino) - 8 - ethylthio - pyrimido-pyrimidine and piperidine.

(c) 2,6 - bis - (diethanolamino) - 4,8 - di - (β - hydroxyethyl-amino)-pyrimido-pyrimidine, melting point 238–241° C., from 2,6-bis-(diethanolamino)-4,8-di-(ethylthio)-pyrimido-pyrimidine and β-hydroxyethyl-amine.

(d) 2,6 - bis - (diethanolamino) - 4,8 - di - (hexamethylene imino)-pyrimido-pyrimidine, melting point 170–172° C., from 2,6-bis-(diethanolamino)-4,8-di-(ethylthio)-pyrimido-pyrimidine and hexamethylene-imine.

(e) 2,6 - bis - (diethanolamino) - 4,8 - di - (3' - methyl-piperidyl)-pyrimido-pyrimidine, melting point 188–190° C., from 2,6-bis-(diethanolamino)-4,8-di-(ethylthio)-pyrimido-pyrimidine and 3-methyl-piperidine.

(f) 2,6 - bis - (diethanolamino) - 4,8 - di - (2' - methyl-piperidyl)-pyrimido-pyrimidine, melting point 208–209° C., from 2,6-bis-(diethanolamino)-4,8-di-(ethylthio)-pyrimido-pyrimidine and 2-methyl-piperidine.

(g) 2,6 - bis - (diethanolamino) - 4,8 - di - (4' - methyl-piperidyl)-pyrimido-pyrimidine, melting point 174–175° C., from 2,6-bis-(diethanolamino)-4,8-di-(ethylthio)-pyrimido-pyrimidine and 4-methyl-piperidine.

(h) 2,4,6,8 - tetramorpholyl - pyrimido - pyrimidine, melting point 266–268° C., from 2,6-dimorpholyl-4,8-di-(ethylthio)-pyrimido-pyrimidine and morpholine.

(i) 2,6 - di-(N' - methyl - piperazyl) - 4,8 - dipiperidyl-pyrimido-pyrimidine, melting point 130–132° C., from 2,6 - di - (N' - methyl - piperazyl) - 4,8 - di - (ethylthio)-pyrimido-pyrimidine and piperidine.

(k) 2,6 - bis - (diethanolamino) - 4,8 - bis - (1'2',5',6'-tetrahydropyridyl)-pyrimido-pyrimidine, melting point 150–152° C., from 2,6-bis-(diethanolamino)-4,8-di-(ethylthio)-pyrimido-pyrimidine and 1,2,5,6-tetrahydro-pyridine.

(l) 2,6 - bis - (diethanolamino) - 4,8 - di - (3' - hydroxy-piperidyl) - pyrimido - pyrimidine, melting point 202–204° C., from 2,6 - bis - (diethanolamino) - 4,8-di-(ethylthio)-pyrimido-pyrimidine and 3-hydroxy-piperidine.

(m) 2,6 - bis - (diisopropanolamino) - 4,8 - dimorpholyl-pyrimido-pyrimidine, melting point 216–218° C., from 2,6 - bis - (diisopropanolamino)-4,8-di-(ethylthio)-pyrimido-pyrimidine and morpholine.

(n) 2 - diisopropanolamino - 6 - diethanolamino - 4,8 - dipiperidyl-pyrimido-pyrimidine, melting point 172–174° C., from 2-diisopropanolamino-6-diethanolamino-4,8-di-(ethylthio)-pyrimido-pyrimidine and piperidine.

(o) 2,6 - di - [ethanol - butanol - (2') - amino] -4,8 - dimorpholyl - pyrimido - pyrimidine, melting point 173–175° C., from 2,6 - di-[ethanol-butanol-(2')-amino]-4,8-di-(ethylthio)-pyrimido-pyrimidine and morpholine.

(p) 2 - ethanol - isopropanol - amino) - 6 - diethanolamino-4,8-dipiperidyl-pyrimido-pyrimidine, melting point 146–148° C., from 2-(ethanol-isopropanol-amino)-6-diethanolamino - 4,8 - di - (ethylthio) - pyrimido - pyrimidine and piperidine.

(q) 2,6 - bis - (diethanolamino) - 4,8 - bis - (2', 6' - dimethyl-morpholyl)-pyrimido-pyrimidine, melting point 181–183° C., from 2,6 - bis - (diethanolamino) - 4,8 - di-(ethylthio)-pyrimido-pyrimidine and 2,6-dimethyl-morpholine.

(r) 2,6 - dipiperidyl - 4,8 - bis - (diethanolamino) - pyrimido-pyrimidine, melting point 182–184° C., from 2,6 - di - (ethylthio) - 4,8 - bis - (diethanolamino) - pyrimido-pyrimidine and piperidine.

(s) 2,6 - dipyrrolidyl - 4,8 - bis - (diethanolamino) - pyrimido - pyrimidine, melting point 178–181° C., from 2,6 - di - (ethylthio) - 4,8 - bis - (diethanolamino) - pyrimido-pyrimidine and pyrrolidine.

EXAMPLE 33

*Preparation of Various 4,8-Diamino-Pyrimido-Pyrimidines*

(a) Preparation of 4,8 - di - (β-hydroxyethyl-amino)-pyrimido-pyrimidine: 2.0 gm. (0.01 mol) 4,8-dithio-pyrimido-pyrimidine were refluxed with 20 cc. β-hydroxy-ethyl-amine for about one hour. The reaction mixture was then taken up in about 60 cc. water and the resulting solution was allowed to stand for several hours. The reaction product separated out as a brownish crystalline precipitate. The yield was 1.4 gm. (56% of theory). Recrystallized from methanol, the pure product was obtained in the form of colorless, brilliant crystals having a melting point of 203–205° C.

The same result was obtained when 3.5 gm. (0.01 mol) 4,8-di-(benzylthio-pyrimido-pyrimidine was used in place of the indicated amount of 4,8-dithio-pyrimido-pyrimidine. The yield was 1.5 gm. (60% of theory) of raw 4,8-di-(β-hydroxyethylamino)-pyrimido-pyrimidine.

Using a procedure analogous to that described under (a) above, the following additional 4,8-diamino-pyrimido-pyrimidine were produced from 4,8-di-(ethylthio)-pyrimido-pyrimidine and the amine indicated in each case.

(b) 4,8-dianilino-pyrimido-pyrimidine, melting point 255–256° C. with aniline.

(c) 4,8-di-(N-hydroxyethyl-p-nitro anilino)-pyrimido-pyrimidine, melting point 265–267° C., with N-hydroxy-ethyl-p-nitro-aniline.

(d) 4,8 - di - (benzyl - ethanol - amino) - pyrimido - pyrimidine, melting point 126–128° C., with benzyl-ethanol-amine.

(e) 4,8 - di - (ethylamino) - pyrimido - pyrimidine, melting point 144–146° C., with ethylamine.

EXAMPLE 34

*Preparation of 2,4,6,8-Tetra-(β-Hydroxyethyl-Amino)-Pyrimido-Pyrimidine from Various Other Substituted Pyrimido-Pyrimidines and β-Hydroxyethyl-Amine*

(a) From 2,6 - di - (ethylthio)-4,8-di-(β-hydroxyethyl-amino)-pyrimido-pyrimidine: 4.2 gm. (0.01 mol) 2,6-di-(ethylthio) - 4,8 - di - (β - hydroxyethyl - amino) - pyrimido-pyrimidine were heated with 50 cc. β-hydroxyethyl-amine for about 15 hours at 220° C. in a sealed tube. The dark solution obtained thereby was then evaporated almost to dryness in vacuo. The residue was admixed with about 50 cc. water and the resulting mixture was allowed to stand for an extended period of time. The raw reaction product separated out in the form of a brownish crystalline precipitate, which was separated by a vacuum filtration, washed and dried. The yield was 1.6 gm. (43% of theory). Recrystallized from water the pure product was obtained in the form of faintly brownish prisms having a melting point of 180–182° C. 2,4,8 - tri - (β - hydroxyethyl - amino) - 6 - (ethylthio) - pyrimido-pyrimidine was identified as an intermediate product of this reaction.

The same result was obtained when 3.7 gm. (0.01 mol) 2,4,6,8 - tetra - (ethylthio) - pyrimido - pyrimidine were substituted in the above procedure for the indicated amount of 2,6 - di - (ethylthio) - 4,8-di-(β-hydroxyethyl-amino)-pyrimido-pyrimidine, and the reaction mixture was refluxed for about 32 hours. The yield of raw 2,4,6,8-tetra-(β-hydroxyethyl)-pyrimido-pyrimidine was 1.1 gm. (29% of theory). 2,4,8 - tri - (β - hydroxyethyl-amino)-6-(ethylthio)-pyrimido-pyrimidine was identified as a side product of this reaction.

(b) From 2,6-di-(β-hydroxyethyl-amino)-4,8-di-phenylthio)-pyrimido-pyrimidine: 4.8 gm. (0.01 mol) 2,6-di-(β - hydroxyethyl - amino) - 4,8 - di - (phenylthio) - pyrimido-pyrimidine were refluxed with 20 cc. β-hydroxy-ethyl-amine for about one hour. The resulting solution was poured into about 40 cc water and the aqueous mixture was allowed to stand for several hours. 2,4,6,8-tetra - (β-hydroxyethyl-amino)-pyrimido-pyrimidine separated out in the form of a crystalline precipitate, which was separated by vacuum filtration, washed and dried. The yield was 2.8 gm. (76% of theory). 2,4,6-tri-(β-hydroxyethyl - amino) - 8 - phenylthio - pyrimido - pyrimidine, melting point about 138° C., was isolated as an intermediate product of this reaction.

The same result was obtained when 4.4 gm. (0.01 mol) 2,6 - di-(β-hydroxyethyl-amino)-4,8-di-(phenoxy)- pyrimido-pyrimidine were substituted for the indicated amount of 2,6-di-(β-hydroxyethyl-amino)-4,8-di-(phenyl-thio)-pyrimido-pyrimidine in the above procedure. The yield of raw product was 3.1 gm. (84% of theory).

(c) From 2,4,6,8-tetrapyridyl-pyrimido-pyrimidine-chloride: 5.9 gm. (0.01 mol) 2,4,6,8-tetrapyridyl-pyrimido-pyrimidine-chloride were refluxed with 30 cc. β-hydroxyethylamine for about one hour. The solution thus obtained was poured into about 60 cc. water and the aqueous mixture was allowed to stand for several hours. 2,4,6,8-tetra-(β-hydroxyethyl-amino)-pyrimido-pyrimidine separated out as a crystalline precipitate. The yield was 1.2 gm. (33% of theory).

The same result was obtained when 0.01 mol 2,4,6,8-tetra-(triethylammonium)-pyrimido-pyrimidine chloride was substituted for the indicated amount of 2,4,6,8-tetrapyridyl-pyrimido-pyrimidine chloride in the above procedure. The yield of raw product was 1.3 gm. (35% of theory).

The tetra-substituted pyrimido-pyrimidine compounds used as starting materials in the above procedures were obtained as follows:

A solution of 5.4 gm. (0.02 mol) 2,4,6,8-tetrachloropyrimido-pyrimidine in 100–150 cc. dry dioxane was heated to about 60° C. 16 cc. pyridine were then added dropwise to this solution over a period of 15 minutes. The reaction product separated out rapidly as a green precipitate which was initially oily but solidified after standing for some time. The dioxane was separated by decantation or by vacuum filtration and the residue or filter cake, respectively, was triturated with acetone, separated by vacuum filtration, washed with acetone and dried in vacuo at room temperature. The 2,4,6,8-tetrapyridyl-pyrimido-pyrimidine chloride thus obtained was a greenish powder which was readily soluble in water and produced a red solution with aqueous alkalies, which is typical of pyridyl salts. The corresponding tetra-(ethylammonium) compound was prepared in similar fashion, except that the reaction mixture was heated slightly. It was obtained as a light brown powder having a melting point of 245–247° C.

(d) From 2,6-di-(β-hydroxyethyl-amino)-4,8-diamino-pyrimido-pyrimidine: 0.01 mol 2,6-di-(β-hydroxyethyl-amino)-4,8-diaminopyrimido-pyrimidine: 0.01 mol 2,6-di-(β-hydroxyethyl-amino)-4,8-diamino-pyrimido-pyrimidine were refluxed with 20 cc. β-hydroxyethylamine for about one hour. The resulting solution was then poured into 50 cc. water and the aqueous mixture was allowed to stand for several hours. 2,4,6,8-tetra-(β-hydroxyethyl-amino)-pyrimido-pyrimidine separted out as a slightly discolored crystalline precipitate.

The same result was obtained when 0.01 mol 2,6-di-(β-hydroxyethyl-amino)-4,8-bis-(diethanol-amino)-pyrimido-pyrimidine or 0.01 mol 2,6-di-(β-hydroxyethyl-amino)-4,8-di-morpholyl-pyrimido-pyrimidine was substituted for the 2,6-di-(β-hydroxyethyl-amino)-4,8-diamino-pyrimido-pyrimidine in the above procedure.

The yields of raw product were, on the average 2.7 gm. (73% of theory).

EXAMPLE 35

*Preparation of Various 2,4,6,8-Tetraamino-Pyrimido-Pyrimidines*

(a) Preparation of 2,4,6,8-tetraanilino-pyrimido-pyrimidine: 4.0 gm. (0.01 mol) 2,6-dianilino-4,8-di-(ethoxy)-pyrimido-pyrimidine were refluxed with 25 cc. aniline for about one hour. The dark brown solution obtained thereby was poured into about 500 cc. 0.5 N hydrochloric acid, whereby the raw tetraanilino-pyrimido-pyrimidine separated out in the form of a brownish amorphous precipitate. After repeated recrystallization from dioxane the pure product was obtained in the form of bright yellow needles having a melting point of 300–302° C.

The same result was obtained when 3.5 gm. (0.01 mol) 2,6-dianilino-4,8-di-(benzyloxy)-pyrimido-pyrimidine were substituted for the indicated amount of 2,6-dianilino-4,8-di-(ethoxy)-pyrimido-pyrimidine in the above procedure.

The yields of raw product were from 4.6 to 4.8 gm. (92–96% of theory).

Using a procedure analogous to that described under (a) above, and under pressure, if necessary, the following tetraamino-pyrimido-pyrimidines were prepared from the starting materials indicated in each case.

(b) 2,4,6,8-tetra-(methylamino)pyrimido-pyrimidine, melting point 227–228° C., from 2,6-di-(methylamino)-4,8-dithio-pyrimido-pyrimidine and methylamine.

(c) 2,4,6,8-tetra-(allylamino)-pyrimido-pyrimidine, melting point 201–202° C., from 2,6-di-(allylamino)-4,8-dithio-pyrimido-pyrimidine and allylamine.

(d) 2,4,6,8-tetra-(benzylamino)-pyrimido-pyrimidine, melting point 176–178° C., from 2,6-di-(benzylamino)-4,8-di-(ethylthio)-pyrimido-pyrimidine and benzylamine.

(e) 2,4,6,8-tetra-(methyl-ethanol-amino)-pyrimido-pyrimidine, melting point 155–156° C., from 2,6-di-(methyl-ethanol-amino)-4,8-dimorpholyl-pyrimido-pyrimidine and methyl-ethanol-amine.

(f) 2,4,6,8-tetra-(diethanolamine)-pyrimido-pyrimidine, melting point 213–214° C., from 2,6-bis-(diethanolamino),4,8-dipiperidyl-pyrimido-pyrimidine and di-ethanolamine.

EXAMPLE 36

*Preparation of Various 2,4,8-Triamino-Pyrimido-Pyrimidines*

(a) Preparation of 2,4,8-trimorpholyl-pyrimido-pyrimidine: 4.0 gm. (0.01 mol) 2-morpholyl-4,8-di-(carboxymethylthio)-pyrimido-pyrimidine were heated with 70 cc. (0.8 mol) morpholine for about three hours at 200° C. in a sealed tube. The solution obtained thereby was extensively evaporated. The residue was taken up in about 200 cc. water, whereby 2,4,8-trimorpholyl-pyrimido-pyrimidine separated out in the form of a faintly yellowish-brown, amorphous precipitate. The yield was 2.1 gm. (71% of theory). Recrystallized from ethanol, the pure product was obtained as a colorless powder having a melting point of 182–184° C.

Using a procedure analogous to that described under (a) above, and refluxing the reaction mixture if necessary, the following triamino-substituted pyrimido-pyrimidines were prepared from the starting materials indicated in each case:

(b) 2,4,8-trianilino-pyrimido-pyrimidine, melting point 203–204° C., from 2-anilino-4,8-di-(carboxy-methylthio)-pyrimido-pyrimidine and aniline.

(c) 2,4,8-tri-(o-methoxy-anilino)-pyrimido-pyrimidine, melting point 214–215° C., from 2-(o-methoxy-anilino)-4,8-di-(ethylthio)-pyrimido-pyrimidine and o-methoxy-aniline.

(d) 2,4,8-tri-(benzylamino)-pyrimido-pyrimidine, melting point 128–130° C., from 2-benzylamino-4,8-di-(ethylthio)-pyrimido-pyrimidine and benzylamine.

(e) 2,4,8-tri-(β-hydroxyethyl-amino)-pyrimido-pyrimidine, melting point 113–115° C., from 2-(β-hydroxy-ethyl-amino)-4,8-di-(phenylthio)-pyrimido-pyrimidine and β-hydroxyethyl-amine.

EXAMPLE 37

*Preparation of 2,4,8-Tri-(Methyl-Ethanol-Amino)-6-Ethylthio-Pyrimido-Pyrimidine*

3.7 gm. (0.01 mol) 2,4,6,8-tetra-(ethyl-thio)-pyrimido-pyrimidine were refluxed with 50 cc. methyl-ethanol-amine for 4 hours. The resulting solution, while it was still warm, was taken up in about 500 cc. water, whereby the reaction product separated out in the form of a light yellow precipitate which was initially somewhat pasty but then crystallized rapidly. The precipitate was separated by vacuum filtration, washed and dried in vacuo at room temperature. The yield of raw product was 3.7 gm.

(91% of theory). Recrystallized from methanol, the pure product was obtained in the form of ivory-colored, microcrystalline prisms having a melting point of 95–97° C.

Analysis.—$C_{17}H_{29}N_7O_3S$; molecular weight: 411.5. Calculated: 49.62% C; 7.10% H. Found: 49.10% C; 7.02% H.

EXAMPLE 38

*Preparation of Various 2,4,8-Triamino-6-Phenyl Pyrimido-Pyrimidines*

(a) Preparation of 2,4,8-trimorpholyl-6-phenyl-pyrimido-pyrimidine: 3.9 gm. (0.01 mol) 2-morpholyl-4,8-di-(ethylthio) - 6 - phenyl - pyrimido-pyrimidine were heated with 80 cc. morpholine for three hours at about 200° C. in a sealed tube. The solution obtained thereby was extensively concentrated by evaporation. The residue was taken up in about 100 cc. water, whereby the reaction product separated out as an orange-colored precipitate. It was separated by vacuum filtration, washed and dried. The yield of raw product was 3.2 gm. (70% of theory). For analysis, the raw product was recrystallized twice from isopropanol, yielding orange microcrystalline needles having a melting point of 236–237° C.

Analysis.—$C_{24}H_{30}N_7O_3$; molecular weight: 464.6. Calculated: 62.06% C; 6.51% H. Found: 62.40% C; 6.63% H.

(b) Preparation of 2 - morpholyl-4,8-di-(β-hydroxyethyl - amino)-6-phenyl-pyrimido-pyrimidine: 3.9 gm. (0.01 mol) 2-morpholyl-4,8-di-(ethylthio)-6-phenyl-pyrimido-pyrimidine were refluxed with 20 cc. β-hydroxyethyl-amine for about one hour. The mixture thus obtained was taken up in about 100 cc. water, whereupon the reaction product separated out in the form of a light yellow precipitate. The yield was 3.1 gm. (75% of theory). Recrystalized from ethanol, the pure product was obtained in the form of a light yellow microcrystalline powder (small needles) having a melting point of 224–246° C.

EXAMPLE 39

*Preparation of Various 2,6-Di-(Ethylthio)4,8-Diamino-Pyrimido-Pyrimidines*

(a) Preparation of 2,6 - di - (ethylthio)-4,8-di-(N'-methyl - piperazyl)-pyrimido-pyrimidine: 3.7 gm. (0.01 mol) 2,4,6,8-tetra-(ethyl-thio)-pyrimido-pyrimidine were refluxed with 15 cc. N-methyl-piperazine for 5 hours. The reaction mixture thus obtained was taken up in 150 cc. water and the aqueous mixture was allowed to stand for several hours. The substituted pyrimido-pyrimidine reaction product separated out as an orange crystalline precipitate, which was isolated by vacuum filtration, washed and dried. For purification, the raw product was recrystallized once from a mixture of methanol and water (3:1), yielding 2.6 gm. (58% of theory) of the analytically pure substance consisting of very small light-orange prisms having a melting point of 119–121° C.

Analysis.—$C_{20}H_{32}N_8S_2$; molecular weight: 448.6. Calculated: 53.45% C; 7.20% H; 14.20% S. Found: 53.54% C; 7.60% H; 14.10% S.

Using a procedure analogous to that described under (a) above, the following 2,6-di-(ethylthio)-4,8-diamino-pyrimido-pyrimidines were prepared from the starting materials indicated in each case:

(b) 2,6 - di - (ethylthio)-4,8-dimorpholyl-pyrimido-pyrimidine, melting point 184–185° C., from 2,4,6,8-tetra-(ethylthio)-pyrimido-pyrimidine and morpholine.

(c) 2,6 - di(ethylthio)-4,8-dipiperidyl-pyrimido-pyrimidine, melting point 132–133° C., from 2,4,6,8-tetra-(ethylthio)-pyrimido-pyrimidine and piperidine.

EXAMPLE 40

*Preparation of Various 2,6-Di-Thio-4,8-Diamino-Pyrimido-Pyrimidines*

The following compounds were prepared using a procedure analogous to that described in Example 39.

(a) 2,6 - di - (ethylthio)-4,8-dipyrolidyl-pyrimido-pyrimidine, melting point 184–186° C., from 2,4,6,8-tetra-(ethylthio)-pyrimido-pyrimidine and pyrollidine.

(b) 2,6 - di - (phenylthio)-4,8-di-(N'-methyl-piperazyl)-pyrimido-pyrimidine, melting point 204–206° C., from 2,4,6,8-tetra-phenylthio)-pyrimido-pyrimidine and N-methyl-piperazine.

(c) 2,6 - di - (benzylthio) - 4,8-di-(N'-methyl-piperazyl)-pyrimido-pyrimidine, melting point 155–156° C., from 2,4,6,8-tetra-(benzylthio)pyrimido-pyrimidine and N-methyl-piperazine.

(d) 2,6 - dithio - 4,8-dipiperidino-pyrimido-pyrimidine, melting point 175–180° C. (decomposition) from 2,4,6,8-tetrathio-pyrimido-pyrimidine and piperidine.

(e) 2,6 - di - (phenylthio) - 4,8-di(methyl-ethanol-amino)-pyrimido-pyrimidine, melting point 147–148° C., from 2,4,6,8-tetra-(phenylthio)-pyrimido-pyrimidine and methyl-ethanol-amine.

(f) 2,6 - di - (benzylthio) - 4,8-di-(methyl-ethanol-amine)-pyrimido-pyrimidine, melting point 115–117° C. from 2,4,6,8-tetra-(benzylthio)-pyrimido-pyrimidine and methyl-ethanol-amine.

(g) 2,6 - di - (phenylthio) - 4,8-dihydrazino-pyrimido-pyrimidine, melting point, 150–152° C., from 2,4,6,8-tetra-(phenyl-thio)-pyrimido-pyrimidine and hydrazine.

EXAMPLE 41

*Preparation of Various 2,4,6-Triamino-8-Thio-Pyrimido-Pyrimidines*

The following compounds were prepared using a procedure analogous of that described in Example 31 but without using pressure, from the corresponding 2,6-bis-(diethanolamino)-4,8-dithio-pyrimido-pyrimidines by refluxing with the corresponding amines.

(a) 2,6 - bis - (diethanolamino) - 4 - morpholyl-8-benzylthio-pyrimido-pyrimidine, melting point 121–124° C., from 2,6-bis-(diethanolamino)-4,8-di-(benzylthio)-pyrimido-pyrimidine and morpholine.

(b) 2,6 - bis - (diethanolamino) - 4 - (1',2',5',6'-tetrahydro - pyridyl) - 8 - ethylthio-pyrimido-pyrimidine, melting point 150–152° C., from 2,6-bis-(diethanolamino)-4,8-di-(ethylthio)-pyrimido-pyrimidine and 1,2,5,6-tetrahydro-pyridine.

(c) 2,6-bis(diethanolamino)-4-(3'-methyl-piperidyl)-8-ethylthio - pyrimido - pyrimidine-hydrochloride, melting point 124–126° C., from 2,6-bis-(diethanolamino)-4,8-di-(ethylthio)-pyrimido-pyrimidine and 3-methyl-piperidine.

(d) 2,6 - bis(diethanolamino) - 4 - (3'-hydroxy-piperidyl) - 8 - ethylthio-pyrimido-pyrimidine, melting point 170–173° C., from 2,6 - bis - (diethanolamino)-4,8-di-(ethylthio)-pyrimido-pyrimidine and 3-hydroxy-piperidine.

(e) 2,6 - bis - (diethanolamino) - 4 - pyrrolidyl-8-äthylthio-pyrimido-pyrimidine, melting point 175–177° C., from 2,6-bis-(diethanolamino)-4,8-di-(ethylthio)-pyrimido-pyrimidine and pyrrolidine.

(f) 2,6 - bis(diethanolamino) - 4 - piperidyl - 8 - benzylthio-pyrimido-pyrimidine, from 2,6-bis-(diethanolamino)-4,8-di-(benzylthio)-pyrimido-pyrimidine and piperidine.

EXAMPLE 42

*Preparation of Various 2,4,6-Tris-(Diethanolamino)-8-Thio-Pyrimido-Pyrimidines*

The following compounds were prepared by using a procedure analogous to that described in Example 31.

(a) 2,4,6 - tris - (diethanolamino)-8-phenylthio-pyrimido-pyrimidine, melting point 182–184° C., from 2,6-bis-(diethanolamino) - 4,8-di-(phenylthio)-pyrimido-pyrimidine or 2,6-dichloro-4,8-di-(phenylthio)-pyrimido-pyrimidine and diethanolamine.

(b) 2,4,6 - tris - (diethanolamino)-8-benzylthio-pyrimido-pyrimidine, melting point 174–175° C., from 2,6-bis - (diethanolamino) - 4,8-di-(benzylthio)-pyrimido-pyrimidine or 2,6-dichloro-4,8-di-(benzylthio)-pyrimido-pyrimidine and diethanolamine.

EXAMPLE 43

*Preparation of Various 2,6-Dimorpholyl-4,8-Di(Alkoxy)-Pyrimido-Pyrimidines*

The following compounds were prepared by using a procedure analogous to that described in Example 23, but without pressure.

(a) 2,6 - dimorpholyl - 4,8 - di - (ethoxy)-pyrimido-pyrimidine, melting point 242–244° C., from 2,6-dichloro-4,8-di-(ethoxy)-pyrimido-pyrimidine and morpholine under reflux.

(b) 2,6-dimorpholyl-4,8-di-(methoxy-ethoxy-pyrimido-pyrimidine, melting point 212–215° C., from 2,6-dichloro-4,8-di-(methoxy-ethoxy)-pyrimido-pyrimidine and morpholine under reflux.

EXAMPLE 44

*2,6-Dimorpholyl-4,8-Dithio-Pyrimido-Pyrimidine*

This compound was obtained by reacting 2,6-dichloro-4,8-dithio-pyrimido-pyrimidine with morpholine.

2.7 gm. (0.01 mol) 2,6-dichloro-4,8-dithio-pyrimido-pyrimidine were refluxed for thirty minutes with 7.0 gm. (0.08 mol) morpholine in 50 cc. dioxane. After the reaction mixture was taken up in 200 cc. water the raw product precipitated out as a brown residue after several hours. The residue was filtered off, washed with water and then dried. The dry residue was dissolved in cold benzene, filtered, and the filtrate then evaporated to dryness in vacuum. The remaining residue was dissolved in a small amount of hot dioxane and after cooling and the addition of methanol the reaction product, separated out as an orange-brown amorphous precipitate, M.P. 187–190°.

EXAMPLE 45

*2,4,8 - Tris - (Methyl - Ethanolamino)-6-Phenylthio-Pyrimido-Pyrimidine, Melting Point 55–58° C.*

This compound was prepared using a procedure analogous Example 37, from 2,4,6,8 - tetra(phenylthio) - pyrimido-pyrimidine and methyl-ethanol-amine.

All of the basic substituted pyrimido-pyrimidines embraced by Formula I above, as well as their non-toxic alkali metal salts and non-toxic acid addition salts exhibit cardiovascular activity. Very low doses produce excellent vasodilation of the coronary arteries without substantially affecting the blood pressure. Higher doses, beginning with about 0.5 to 1.0 mgm./kg. body weight, produce a hypotensive effect which is the result of general vasodilation and decrease in peripheral resistance; not only the coronary arteries but also the blood vessels of the brain are dilated, causing a marked and comparatively prolonged increase in the blood flow through the brain.

The above-described effects of the compounds embraced by Formula I are not accompanied by any adverse effects upon the heart. This is proven by the fact that, for instance, 2,6 - bis - (diethanolamino)-4,8-dipiperidyl-pyrimido-pyrimidine markedly increases the cardiac output. The range of therapeutic application of the new compounds is quite remarkable.

Specific compounds of the generic group which are especially effective as vasodilators and produce the above-described advantageous effects are, for instance, the following:

2,6 - bis - (diethanolamino) - 4,8 - dipyrrolidyl-pyrimido-[5,4-d]-pyrimidine;
2,6 - bis - (diethanolamino) - 4,8 - bis-(diethylamino)-pyrimido-[5,4-d]-pyrimidine;
2,6 - bis - (diethanolamino) - 4,8 - dimorpholyl-pyrimido-[5,4-d]-pyrimidine;
2,6 - dimorpholyl - 4,8 - di - (propyl - ethanol - amino)-pyrimido-[5,4-d]-pyrimidine;
2,6 - dimorpholyl - 4,8 - bis - (diethanolamino) - pyrimido-[5,4-d]-pyrimidine;
2,6 - bis - (diisopropanolamino) - 4,8-dipiperidyl-pyrimido-[5,4-d]-pyrimidine;
2,6 - di - (methyl-ethanol-amino)-4,8-dipiperidyl-pyrimido-[5,4-d]-pyrimidine;
2,6-dimorpholyl-4,8-di-(methyl-ethanol-amino)-pyrimido-[5,4-d]-pyrimidine;
2,4,6,8 - tetra - (methyl - ethanol - amino) - pyrimido-[5,4-d]-pyrimidine;
4,6,8-trimorpholyl-pyrimido-[5,4-d]-pyrimidine;
6 - diethanolamino - 4,8-dimorpholyl-pyrimido-[5,4-d]-pyrimidine;
4,6,8-tri-(methylamino)-pyrimido-[5,4-d]-pyrimidine;
6 - morpholyl - 4,8 - bis - (ethylamino) - pyrimido-[5,4-d]-pyrimidine;
6-morpholyl-4,8-diamino-pyrimido-[5,4-d]-pyrimidine;
4,8 - bis - (methylamino) - pyrimido - [5,4-d] - pyrimidine; and
4,8-bis-(dimethylamino)-pyrimido-[5,4-d]-pyrimidine.

In addition to the above-described cardiovascular activity, the compounds of the invention also exhibit a high spasmolytic activity which approaches and even surpasses the spasmolytic activity of papaverine. Especially effective spasmolytic agent of the generic group are, for instance, the following compounds:

2,6 - di - (ethyl - ethanol - amino) - 4,8 - dimorpholyl-pyrimido-[5,4-d]-pyrimidine;
2,6 - dimorpholyl - 4,8 - di - (propyl - ethanol - amino)-pyrimido-[5,4-d]-pyrimidine;
6 - morpholyl - 4,8 - di - (ethyl - ethanol-amino)-pyrimido-[5,4-d]-pyrimidine;
6 - morpholyl - 4,8 - bis - (ethylamino - pyrimido-[5,4-d]-pyrimidine.

All these compounds are considerably more effective and also exhibit a more prolonged activity than theophylline. The most active compounds of this group of compounds are many times as effective as papaverine.

4,6,8 - tri - (methylamino)-pyrimido-[5,4-d]-pyrimidine exhibits not only a cardiovascular activity but has also diuretic properties corresponding to those of theophylline, but of considerably more prolonged duration.

6 - (β-diethylamino-ethoxy)-4,8-dimorpholyl-pyrimido-[5,4-d]-pyrimidine has a markedly better dilating effect upon the coronary arteries than theophylline and lowers the blood pressure only slightly.

2,6 - dimorpholyl - 4,8 - bis-(propyl-ethanol-amino)-pyrimido-[5,4-d]-pyrimidine has a cardiovascular as well as a diuretic activity.

While we have disclosed various specific embodiments of our invention, it will be obvious to persons skilled in the art that various changes and modifications may be made therein without departing from the spirit of the invention or the scope of the appended claims.

We claim:
1. A compound selected from the group consisting of basic substituted pyrimido-[5,4-d]-pyrimidines having the formula

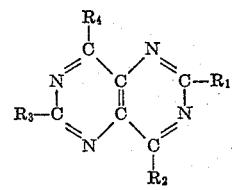

wherein from two to four, inclusive, of the substituents $R_1$, $R_2$, $R_3$ and $R_4$ are basic moieties selected from the group consisting of amino, lower alkylamino, dialkylamino wherein the alkyl moieties have from 1 to 12 carbon atoms, mono-(hydroxy-lower alkyl)amino, di-(hydroxy-lower alkyl)-amino, (hydroxy-lower alkyl)-alkylamino wherein the alkyl moiety has from 1 to 12 carbon atoms, (lower alkoxy-lower alkyl)-amino, lower alkenyl-amino, cyclohexyl-amino, phenyl-amino, halophenyl-amino, nitrophenyl-amino, (lower alkoxy-phenyl)-amino, [(di-lower alkyl-amino)-phenyl]-amino, benzylamino, semicarbazidyl, hydrazinyl, guanidyl, ethyleneimino, piperidyl, lower alkyl-piperidyl, lower alkoxy-piperidyl, hydroxy-piperidyl, pyrrolidyl, lower alkyl-pyrrolidyl, lower alkoxy-pyrrolidyl, hydroxy-pyrrolidyl, morpholyl, lower alkyl-morpholyl, lower alkoxy-morpholyl, hydroxy-morpholyl, tetrahydropyridyl, lower alkyl-tetrahydropyridyl, lower alkoxy-tetrahydropyridyl, hydroxy-tetrahydropyridyl, hexamethyleneimino, lower alkyl-hexamethyleneimino, lower alkoxy-hexamethyleneimino, hydroxy-hexamethyleneimino, tetrahydroquinolyl, lower alkyl-tetrahydroquinolyl, lower alkoxy-tetrahydroquinolyl, hydroxy-tetrahydroquinolyl, piperazyl, lower alkylpiperazyl, lower alkoxy-piperazyl, hydroxy-piperazyl and N'-lower alkyl-piperazyl, and the remaining substituents $R_1$ to $R_4$ are selected from the group consisting of hydrogen, halogen, hydroxyl, mercapto, lower alkyl, phenyl, lower alkoxy, di-lower-alkyl-amino-lower alkoxy and lower alkyl-thio, phenyl-thio, benzyl-thio, lower alkoxy-lower alkoxy, their non-toxic alkali metal salts and their non-toxic acid addition salts.

2. 2,6 - bis - (diethanol - amino) - 4,8 - dipiperidyl-pyrimido-[5,4-d]-pyrimidine.

3. 2,6 - bis - (diisopropanol - amino) - 4,8 - dimorpholyl-pyrimido-[5,4-d]-pyrimidine.

4. 2,6 - bis - (diethanol - amino) - 4 - piperidyl - 8-ethyl-thio-pyrimido-[5,4-d]-pyrimidine.

5. 2,6 - bis - (diethanol - amino) - 4,8 - bis - (3' - methyl-piperidyl)-pyrimido-[5,4-d]-pyrimidine.

6. 2 - (diisopropanol - amino) - 6 - (diethanol - amino)-4,8-dipiperidyl-pyrimido-[5,4-d]-pyrimidine.

7. 2,6 - bis - (diethanol - amino) - 4,8 - bis - (1',2',5',6'-tetrahydro-pyridyl)-pyrimido-[5,4-d]-pyrimidine.

8. 2,6 - bis - (diethanol - amino) - 4,8 - di - (3' - hydroxy-piperidyl)-pyrimido-[5,4-d]-pyrimidine.

9. 2,6 - bis - (diethanol - amino) - 4,8 - di - (hexamethyleneimino)-pyrimido-[5,4-d]-pyrimidine.

10. 6 - chloro - 4,8 - di - (ethyleneimino) - pyrimido-[5,4-d]-pyrimidine.

References Cited in the file of this patent

FOREIGN PATENTS 807,826    Great Britain _____ Jan. 21, 1959

UNITED STATES PATENT OFFICE
CERTIFICATE OF CORRECTION

Patent No. 3,031,450                                            April 24, 1962

Franz Gottwalt Fischer et al.

It is hereby certified that error appears in the above numbered patent requiring correction and that the said Letters Patent should read as corrected below.

Column 5, line 47, for "hydroge" read -- hydrogen --; column 7, line 62, for "4.29%" read -- 4.92% --; column 9, line 52, strike out "pyrimido-"; column 10, lines 35 and 36, for "(diisopropanol-amino)" read -- (diisopropanol-amine) --; column 11, line 41, for "theroetical" read -- theoretical --; same column, line 54, for "Dipieridyl" read -- Dipiperidyl --; column 13, line 62, for "pyrimiden" read -- pyrimidine --; column 16, line 33, for "41-143° C." read -- 141-143° C. --; line 51, for "18-160° C." read -- 158-160° C. --; same column, line 55, for "92-193° C." read -- 192-193° C. --; column 17, lines 48 and 49, after "corresponding" insert -- sodium --; same column, line 61, for "analyltical" read -- analytical --; column 18, line 73, for "(3'-methyl-piyeridyl)-" read -- (3'-methyl-piperidyl)- --; column 19, line 35, for "2,6-d-" read -- 2,6-di- --; column 20, line 33, for "(diethyanolamino)" read -- (diethanolamino) --; column 22, line 9, for "81% of theory)." read -- (81% of theory). --; same column, line 11, for "chlorinde" read -- chloride --; column 24, line 29, for "2,6-(diethanol-amino)" read -- 2,6-bis-(diethanol-amino) --; same column, line 52, for "-ethylthio)-" read -- -(ethylthio)- --; column 25, line 50, for "-ethanol-" read -- -(ethanol- --; column 26, line 9, for "-(benzylthio-" read -- -(benzylthio)- --; line 43, strike out "a"; same column, lines 60 and 61, for "-phenylthio)-" read -- -(phenylthio)- --; column 27, lines 44 and 45, strike out ": 0.01 mol 2,6-di-(β-hydroxyethyl-amino)-4,8-diamino-pyrimido-pyrimidine"; column 28, line 1, strike out 2,6-dianilino-4,8-di-(benzyloxy)-pyrimido-pyrimidine" and insert instead -- 2,6-dianilino-4,8-dihydroxy-pyrimido-pyrimidine or 5.3 gm (0.01 mol) 2,6-dianilino-4,8-di-(benzyloxy)-pyrimido-pyrimidine --; column 29, line 38, for "224-" read -- 244- --; column 30, line 6, for "-phenylthio)-" read -- -(phenylthio)- --; column 31, line 14, for "-ethoxy" read -- -ethoxy) --; column 32, line 34, for "-(ethylamino-" read -- -(ethylamino)- --.

Signed and sealed this 11th day of September 1962.

(SEAL)
Attest:

ERNEST W. SWIDER                                    DAVID L. LADD
Attesting Officer                                  Commissioner of Patents